(12) United States Patent
Ryoo et al.

(10) Patent No.: US 11,561,360 B2
(45) Date of Patent: Jan. 24, 2023

(54) OPTICAL SYSTEM

(71) Applicant: TDK TAIWAN CORP., Taoyuan (TW)

(72) Inventors: Jungsuck Ryoo, Taoyuan (TW);
Pai-Jui Cheng, Taoyuan (TW);
Chao-Chang Hu, Taoyuan (TW);
Min-Hsiu Tsai, Taoyuan (TW);
Shu-Shan Chen, Taoyuan (TW);
Chieh-An Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 405 days.

(21) Appl. No.: 16/899,791

(22) Filed: Jun. 12, 2020

(65) Prior Publication Data

US 2021/0080681 A1 Mar. 18, 2021

Related U.S. Application Data

(60) Provisional application No. 62/899,423, filed on Sep. 12, 2019.

(51) Int. Cl.
| | | |
|---|---|---|
| *G02B 7/00* | (2021.01) | |
| *G02B 7/02* | (2021.01) | |
| *H04N 5/232* | (2006.01) | |
| *G02B 7/04* | (2021.01) | |
| *G02B 27/64* | (2006.01) | |
| *G03B 5/00* | (2021.01) | |
| *G03B 13/36* | (2021.01) | |
| *H02N 2/10* | (2006.01) | |
| *H02N 2/14* | (2006.01) | |
| *G03B 3/10* | (2021.01) | |

(52) U.S. Cl.
CPC ............ *G02B 7/005* (2013.01); *G02B 7/022* (2013.01); *G02B 7/04* (2013.01); *G02B 27/646* (2013.01); *G03B 3/10* (2013.01); *G03B 5/00* (2013.01); *G03B 13/36* (2013.01); *H02N 2/103* (2013.01); *H02N 2/142* (2013.01); *H04N 5/232* (2013.01); *G03B 2205/0007* (2013.01); *G03B 2205/0061* (2013.01)

(58) Field of Classification Search
CPC ...... G02B 7/005; G02B 7/022; G02B 27/646; G03B 3/10; G03B 5/00; G03B 2205/0007; G03B 2205/0061; H04N 5/232
See application file for complete search history.

(56) References Cited

U.S. PATENT DOCUMENTS 5,410,206 A * 4/1995 Luecke ................. G02B 7/005
 310/317
11,314,031 B2 * 4/2022 Hu ......................... G02B 7/005
(Continued)

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

An optical system is provided. The optical system includes a first optical module. The first optical module includes a first fixed portion, a first movable portion, a first driving assembly, and a circuit assembly. The first movable portion is used for connecting to a first optical element, and the first movable portion is movably connected to the fixed portion. The first driving assembly is used for driving the first movable portion to move relative to the first fixed portion. The circuit assembly is electrically connected to the first driving assembly.

18 Claims, 19 Drawing Sheets

(56) References Cited

U.S. PATENT DOCUMENTS

| | | | |
|---|---|---|---|
| 2015/0130956 A1* | 5/2015 | Ohashi | H04N 5/23287 |
| | | | 359/557 |
| 2017/0047864 A1* | 2/2017 | Stang | H02N 2/025 |
| 2018/0136438 A1* | 5/2018 | Ho | G03B 5/00 |
| 2018/0175747 A1* | 6/2018 | Tomura | H02N 2/0055 |
| 2018/0210194 A1* | 7/2018 | Nishiyama | B06B 1/06 |
| 2020/0393637 A1* | 12/2020 | Ryoo | H02N 2/142 |

* cited by examiner

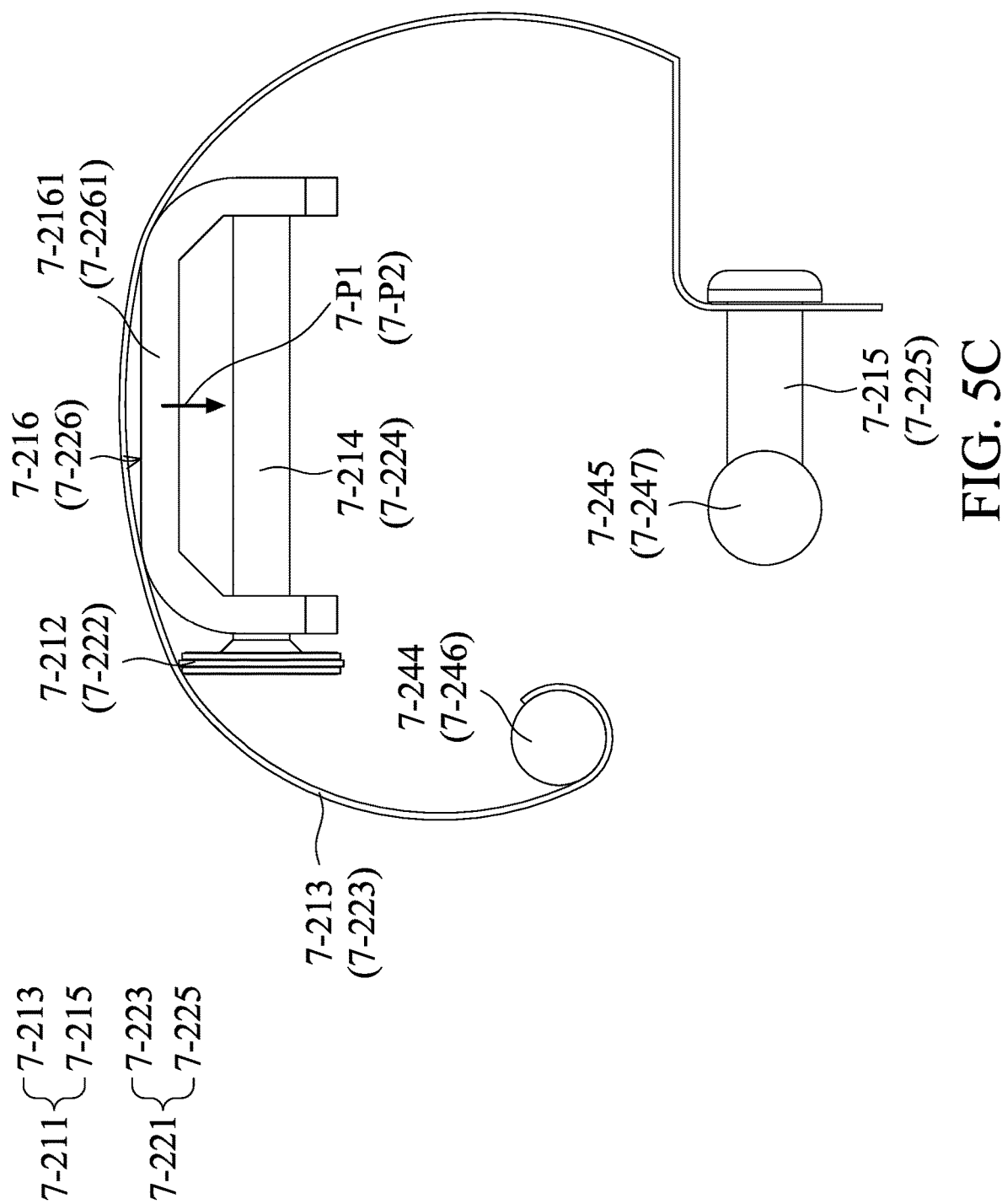

OPTICAL SYSTEM

CROSS REFERENCE TO RELATED APPLICATIONS

The present application claims priority to U.S. Provisional Patent Application No. 62/899,423, filed on Sep. 12, 2019, which is incorporated by reference herein in their entirety.

BACKGROUND OF THE DISCLOSURE

Field of the Disclosure

The present disclosure relates to an optical system, and, in particular, to an optical system having piezoelectric driving assembly.

Description of the Related Art

As technology has developed, it has become more common to include image capturing or recording functions into many types of modern electronic devices, such as smartphones and digital cameras. These electronic devices are used more and more often, and new models have been developed that are convenient, thin, and lightweight, and provide consumers with more choice.

Electronic devices that have image capturing or recording functions normally include a driving mechanism to drive an optical element (e.g. a lens) to move along its optical axis, thereby achieving auto focus (AF) or optical image stabilization (OIS). Light may pass through the optical element and may form an image on an optical sensor. However, the current trend in modern mobile devices is to have a smaller size and a higher durability. As a result, how to effectively reduce the size of the driving mechanism and how to increase its durability has become an important issue. Furthermore, producing an electronic device that can capture images from different directions is also an important issue in the industry.

BRIEF SUMMARY OF THE DISCLOSURE

An optical system is provided. The optical system includes a first optical module. The first optical module includes a first fixed portion, a first movable portion, a first driving assembly, and a circuit assembly. The first movable portion is used for connecting to a first optical element, and the first movable portion is movably connected to the fixed portion. The first driving assembly is used for driving the first movable portion to move relative to the first fixed portion. The circuit assembly is electrically connected to the first driving assembly. As a result, the optical system may capture images from different directions, and miniaturization may be achieved.

In some embodiments, the first driving assembly is used for driving the first movable portion to rotate relative to the first fixed portion, the rotational axis of the first movable portion extends in a first direction, and the first driving assembly includes a first driving source and a first transmission element. The a first driving source is used for generating a first driving force. The first driving source includes a first piezoelectric element and a first resilient element disposed on the first piezoelectric element. The first transmission element is connected to the first driving source, and the first transmission element is used for transmitting the first driving force.

In some embodiments, the first transmission element has an elongated shape and extends in a second direction that is not parallel to the first direction. The first optical module further includes a first pressing assembly used for applying a first pressure to the first driving assembly. The first driving assembly and the first movable portion are arranged in the direction of the first pressure, the direction of the first pressure is not parallel to the first direction. The first pressing assembly includes a first pressing element that is resilient, a first adjusting element, and a first frame. The first adjusting element, and a first frame is disposed on the first pressing element, the first adjusting element is used for adjusting the value or the direction of the first pressure, and the first adjusting element includes thread. The first driving assembly is disposed on the first frame.

In some embodiments, the first driving assembly further includes a first bonding element, a second bonding element, a third bonding element, and a position sensing assembly. The first transmission element is connected to the first driving source via the first bonding element. The first resilient element is connected to the first piezoelectric element via the second bonding element. The first transmission element is connected to the first frame via the third bonding element. The position sensing assembly is used for sensing the movement of the first movable portion to the first fixed portion.

In some embodiments, the Young's modulus of the first bonding element is greater than the Young's modulus of the second bonding element, and the Young's modulus of the first bonding element is greater than the Young's modulus of the third bonding element.

In some embodiments, the Young's modulus of the second bonding element is greater than the Young's modulus of the third bonding element; and In some embodiments, the first frame includes a first main body, a first through hole, a second through hole, a first leaning portion, and a second leaning portion. The first through hole is positioned at the first main body, and the first through hole is used for accommodating at least a portion of the first transmission element. The second through hole is positioned at the first main body, and the second through hole is used for accommodating at least a portion of the first transmission element. The first leaning portion is disposed on the main body and corresponding to the first pressure assembly. The second leaning portion disposed on the main body and corresponding to the first pressure assembly, and the first leaning portion and the second leaning portion are arranged parallel to the second direction.

In some embodiments, the first optical element is used for adjusting the direction of an incident light from an incident direction to a first exit direction, the incident direction is not parallel to the first exit direction, and the first optical module further includes a second movable portion and a second driving assembly. The second movable portion is used for connecting to a second optical element, and the second movable portion is movable relative to the fixed portion. The second driving assembly is used for driving the second movable portion to move relative to the first fixed portion.

In some embodiments, the rotational axis of the second movable portion extends in the first direction, the second optical element is used for adjusting the direction of the incident light from the first exit direction to a second exit direction, and the first exit direction and the second exit direction are not parallel.

In some embodiments, the second driving assembly includes a second driving source. The second driving source is used for generating a second driving force, including a second piezoelectric element, a second resilient element disposed on the second piezoelectric element, and a second transmission element used for transmitting the second driving force. The second transmission element has an elongated shape and extends in a third direction, the third direction is not parallel to the first direction, and the first optical module further includes a second pressing assembly used for applying a second pressure to the second driving assembly. The second driving assembly and the second movable portion are arranged in the direction of the second pressure, the direction of the second pressure is not parallel to the first direction, and the second pressing assembly includes a second pressing element that is resilient, and a second adjusting element used for adjusting the value or the direction of the second pressure.

In some embodiments, the first movable portion, the second movable portion rotate relative to the fixed portion in an identical rotational axis, the first driving assembly does not overlap the second driving assembly when viewed in the first direction, viewed in the second direction, and viewed in a fourth direction. The first direction, the second direction, and the fourth direction are perpendicular each other.

In some embodiments, the second direction is parallel to the third direction, and the first driving assembly and the second driving assembly are arranged in a fifth direction when viewed in the second direction. The fifth direction is not parallel to the first direction, the second direction, and the fourth direction, the fifth direction is not perpendicular to the first direction and the fourth direction, and the direction of the first driving force is parallel to the direction of the second driving force.

In some embodiments, the optical system further including a second optical module corresponding to the first optical module. The second optical module includes a lens and a photosensitive element corresponding to the lens. The lens and the photosensitive element are arranged in the second exit direction, the second exit direction is not parallel to the first direction, the second exit direction is parallel to the second direction, and the first optical module and the second optical module are arranged in the second direction.

In some embodiments, the optical system further includes a third movable portion connected to the first optical module and the second optical module and a second fixed portion. The third movable portion is movable relative to the second fixed portion a third driving assembly used for driving the third movable portion to move relative to the second fixed portion. The third driving assembly is used for rotate the third movable portion relative to the second fixed portion, and the rotational axis of the third movable portion extends in a sixth direction. The third driving assembly includes a third driving source used for generating a third driving force.

In some embodiments, the third driving source includes:
a third piezoelectric element;
a third resilient element disposed on the third piezoelectric element; and
a third transmission element used for transmitting the third driving force, wherein the third transmission element has an elongated shape and extends in a seventh direction that is not parallel to the sixth direction.

In some embodiments, the optical system further including a third pressing assembly used for applying a third pressure to the third driving assembly. The third driving assembly and the third movable portion are arranged along the direction of the third pressure, the direction of the third pressure is not parallel to the sixth direction.

In some embodiments, the third pressing assembly includes a third pressing element that is resilient, and a third adjusting element used for adjusting the value or direction of the third pressure. The first direction is not parallel to the sixth direction, the seventh direction is parallel to an imaginary plane, the imaginary plane is parallel to the first direction, the imaginary plane is perpendicular to the sixth direction, and the first driving assembly and the second driving assembly are movable relative to the third driving assembly. The third driving assembly does not overlap the first driving assembly when viewed in the sixth direction, and the third driving assembly does not overlap the second driving assembly when viewed in the sixth direction.

In some embodiments, the circuit assembly includes a first circuit element and a second circuit element. The first circuit element and the second circuit element are arranged in the sixth direction, and the optical system further includes a control element, a power source, a wireless communication element, a passive electronic element, an interference-suppressing element, and a first spacer. The control element is disposed on the second circuit element. The control element is used for controlling the first driving assembly and the second driving assembly. The power source is disposed on the second circuit element. The wireless communication element is disposed on the second circuit element, and the wireless communication element is used for providing a wireless signal to an external apparatus. The passive electronic element is disposed on the second circuit element. The interference-suppressing element is disposed on the second circuit element. The first spacer is disposed between the first circuit element and the second circuit element.

In some embodiments, the first circuit element and the second circuit element are plate-shaped, the first circuit element and the second circuit element are parallel, a gap is formed between the first circuit element and the second circuit element, the first circuit element is closer to the second optical module than the second circuit element, the position sensing assembly is at least partially disposed on the first circuit element.

In some embodiments, the first driving assembly is electrically connected to the first circuit element, the interference-suppressing element is disposed between the position sensing assembly and the second circuit element, and the interference-suppressing element is disposed between the first circuit element and the second circuit element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 5C is a top view of the first driving assembly or the second driving assembly.

DETAILED DESCRIPTION OF THE DISCLOSURE

Figure 1:
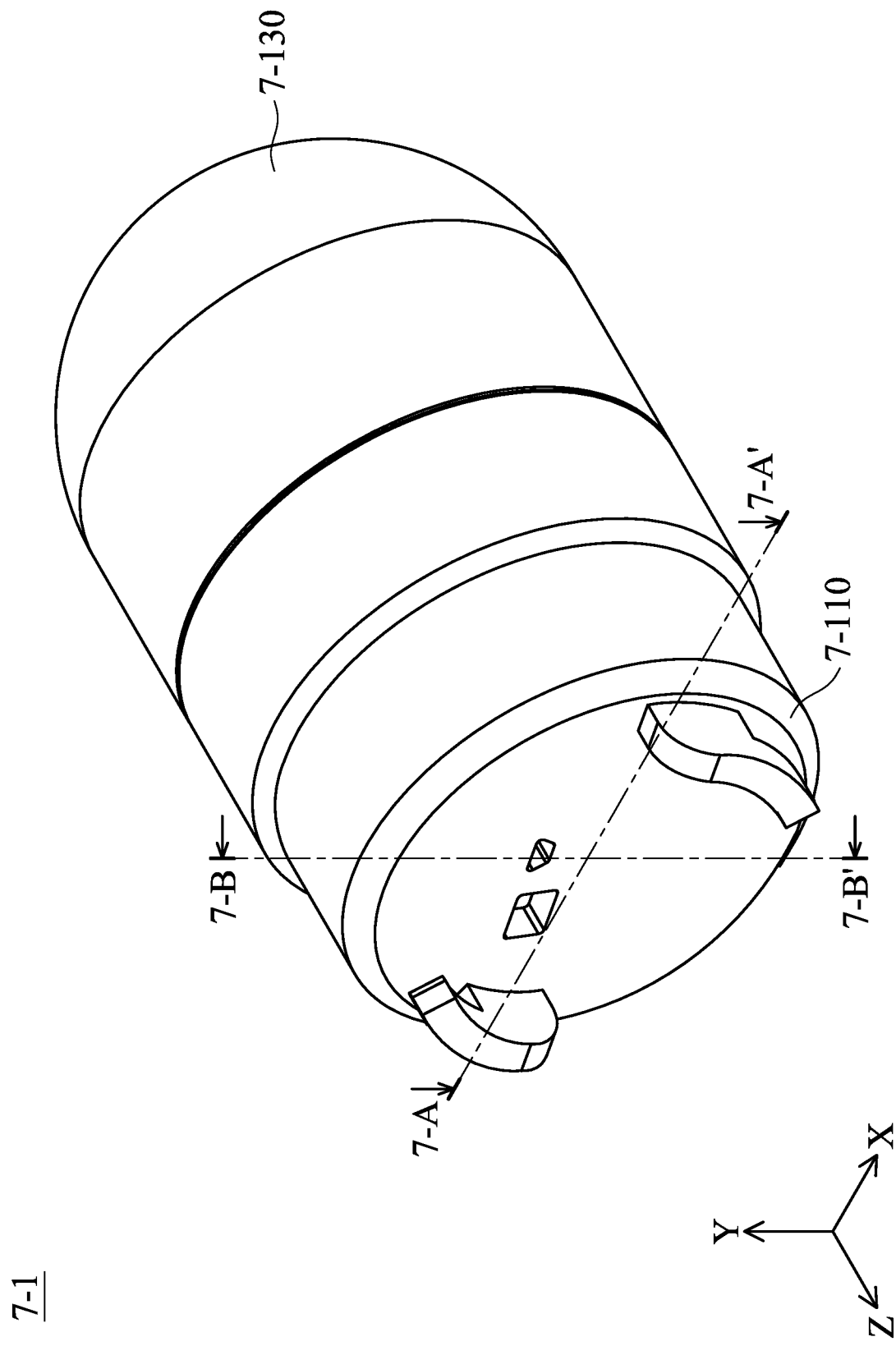
FIG. 1 is a schematic view of an optical system in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

Figure 2:
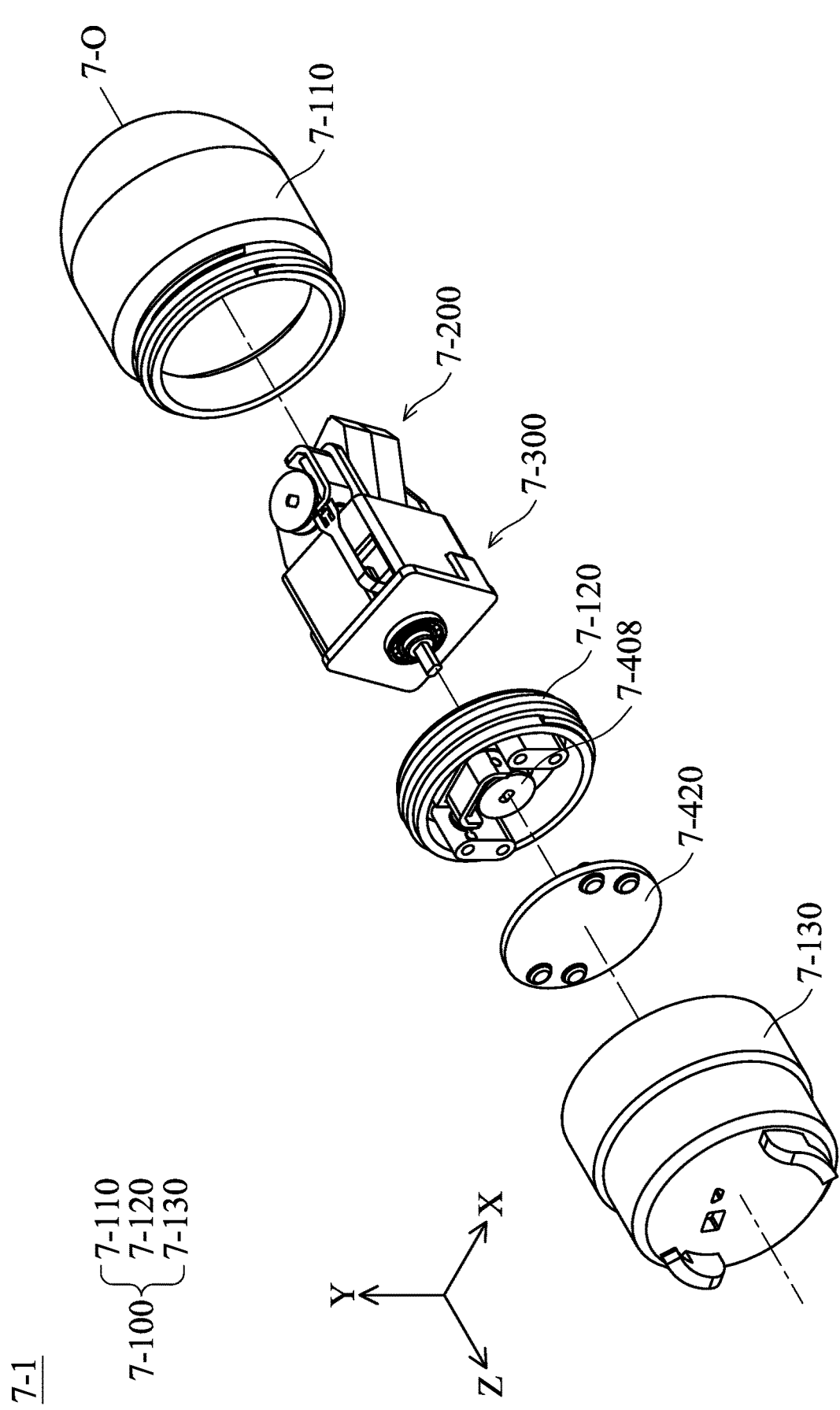
FIG. 2 is an exploded view of the optical system.
Figure 3A:
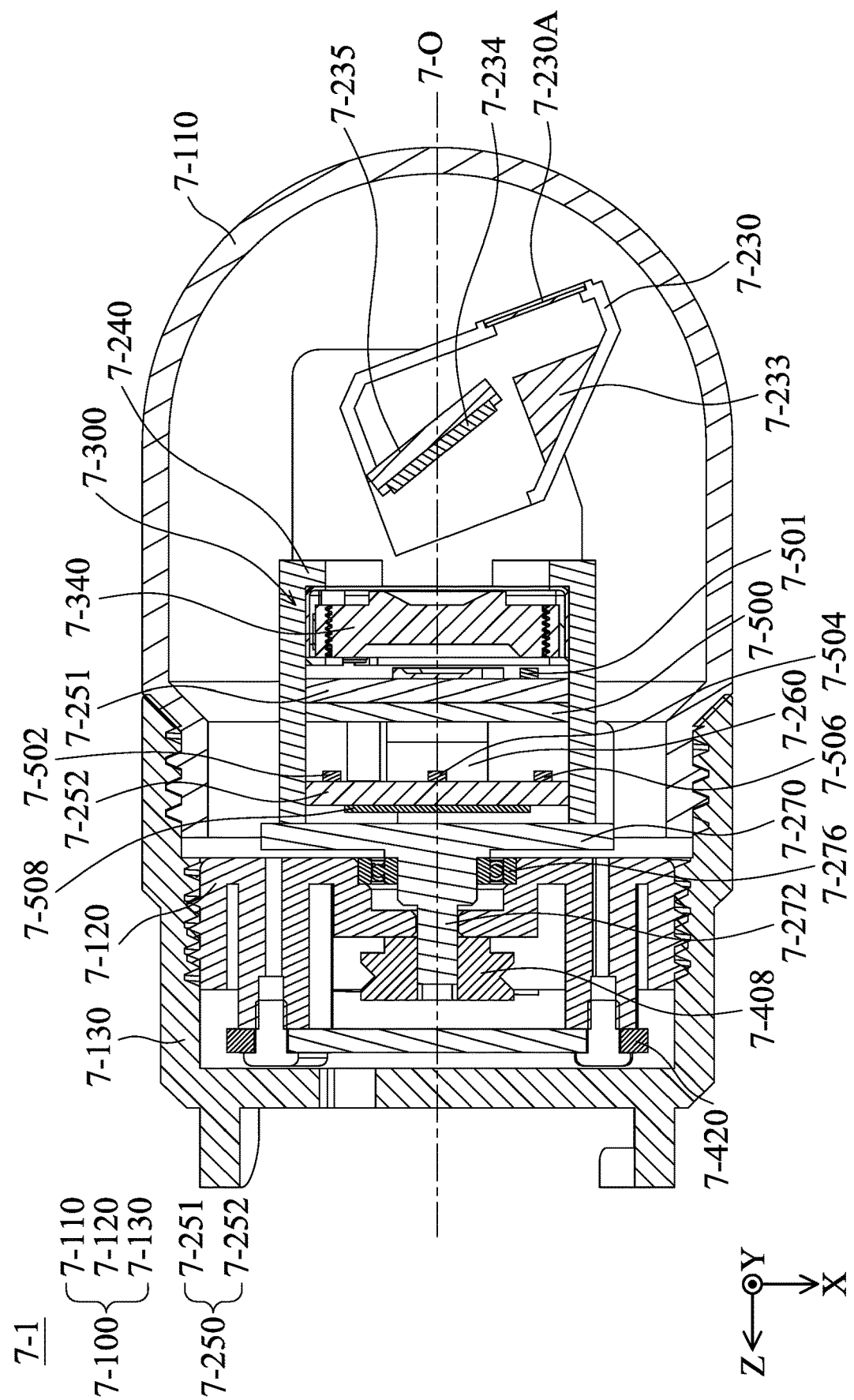
FIG. 3A and FIG. 3B are cross-sectional views illustrated along the line 7-A-7-A' and 7-B-7-B' in FIG. 1, respectively.
Figure 3B:
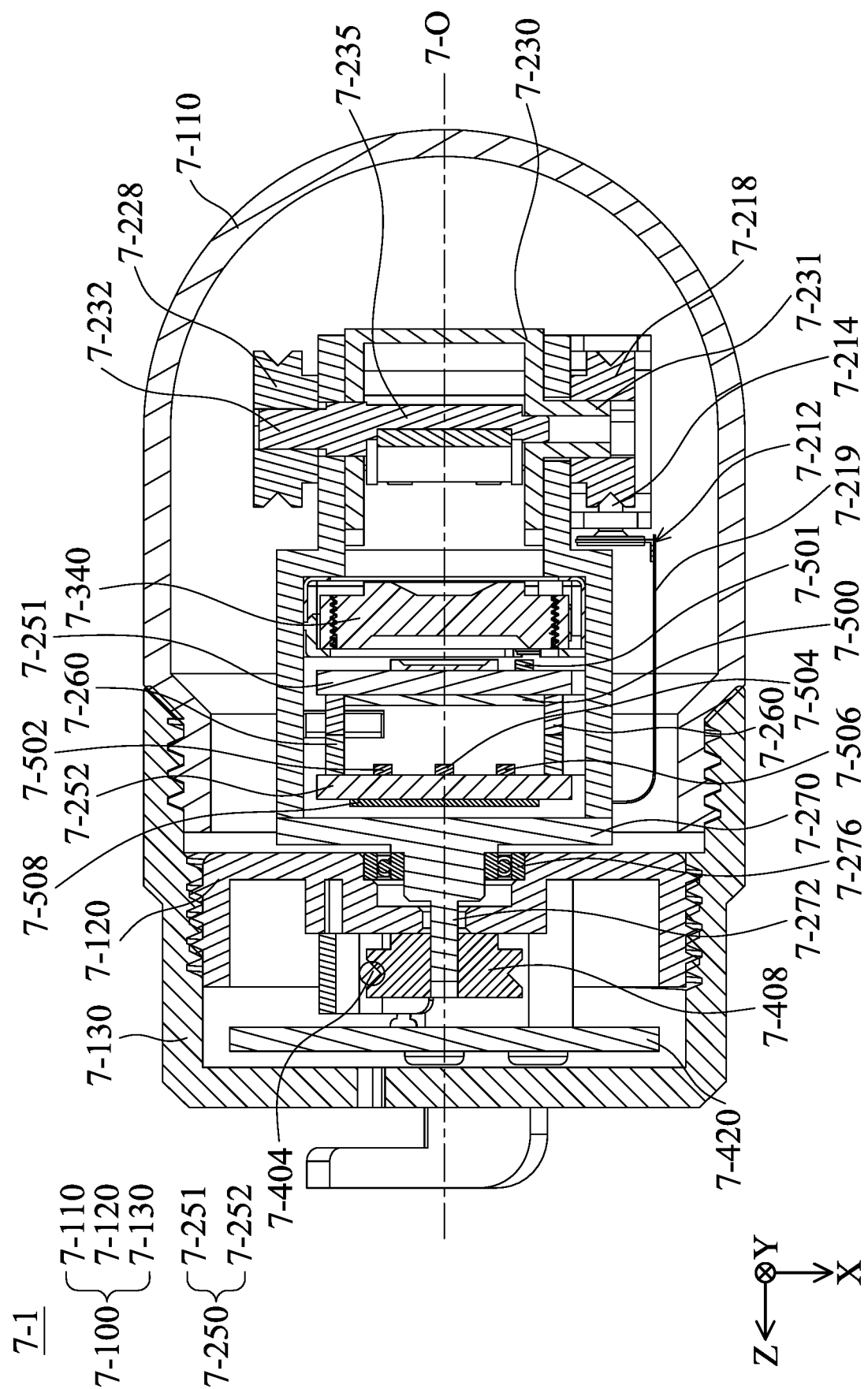

FIG. 1 is a schematic view of an optical system 7-1 in some embodiments of the present disclosure. FIG. 2 is an exploded view of the optical system 7-1. FIG. 3A and FIG. 3B are cross-sectional views illustrated along the line 7-A-7-A' and the line 7-B-7-B' in FIG. 1, respectively, wherein the line 7-A-7-A' and the line 7-B-7-B' are perpendicular. The optical system 7-1 mainly includes a fixed portion 7-100 (which includes a first fixed portion 7-110, a second fixed portion 7-120, a third fixed portion 7-130), a first optical module 7-200, a second optical module 7-300 and other elements (described later) arranged in a main axis 7-O.

The fixed portion 7-100 may act as the housing of the optical system 7-1, and the first optical module 7-200 and the second optical module 7-300 may be disposed in the fixed portion 7-100. For example, the first fixed portion 7-110 and the second fixed portion 7-120 may be locked on the third fixed portion 7-130, and the second fixed portion 7-120 may be disposed between the first fixed portion 7-110 and the third fixed portion 7-130.

In some embodiments, the material of the third fixed portion 7-130 may include transparent material (e.g., glass or plastic), and external light may pass through the third fixed portion 7-130, and the first optical module 7-200 may adjust the path of the light to allow the light reach the second optical module 7-300. As a result, light from different directions may be detected by the optical system 7-1.

Figure 4:
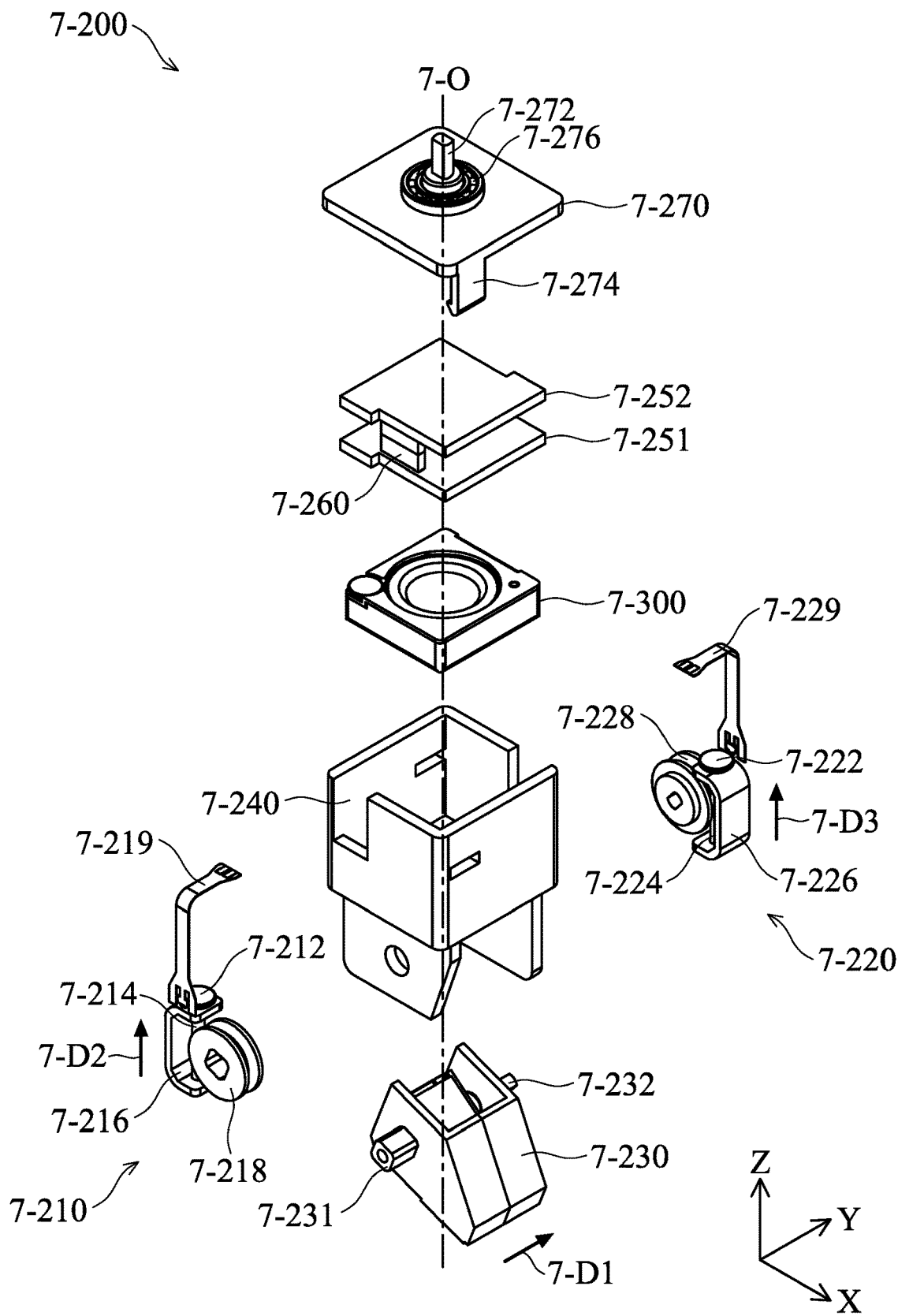
FIG. 4 is an exploded view of a first optical module and an second optical module.
Figure 5A:
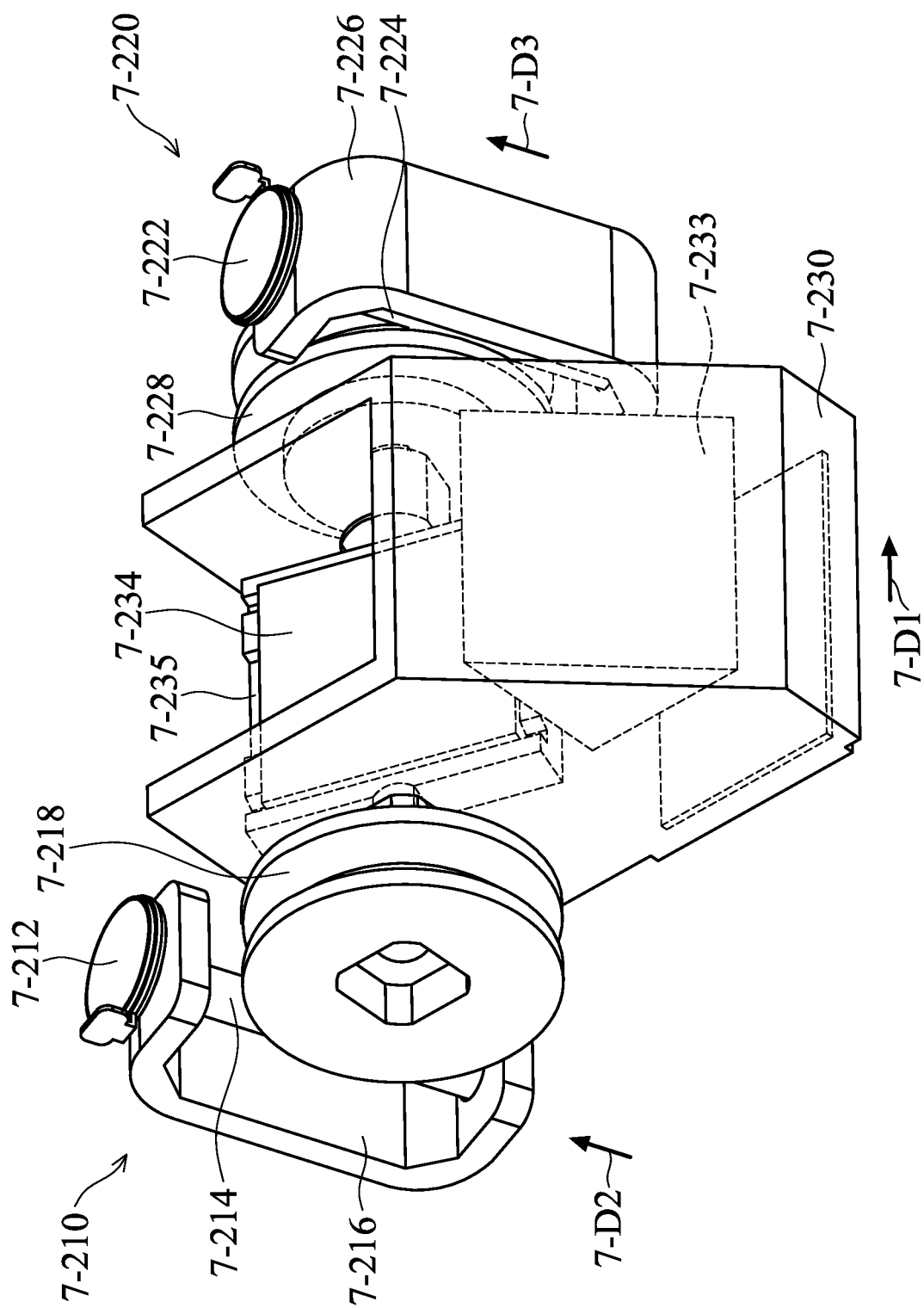
FIG. 5A is a perspective view of some elements of the optical module.

FIG. 4 is an exploded view of the first optical module 7-200 and the second optical module 7-300. FIG. 5A is a perspective view of some elements of the first optical module 7-200. The first optical module 7-200 mainly includes a first driving assembly 7-210, a second driving assembly 7-220, a first case 7-230, a second case 7-240, a circuit assembly 7-250 (which includes a first circuit element 7-251 and a second circuit element 7-252), a spacer 7-260, and a top cover 7-270.

The first driving assembly 7-210 and the second driving assembly 7-220 may be disposed on opposite sides of the first case 7-230. The first driving assembly 7-210 mainly includes a first driving source 7-212, a first transmission element 7-214, a first frame 7-216, and a first movable portion 7-218. The second driving assembly 7-220 mainly includes a second driving source 7-222, a second transmission element 7-224, a second frame 7-226, and a second movable portion 7-228. Furthermore, a first optical element 7-233, a second optical element 7-234, and a holding portion 7-235 may be disposed in the first case 7-230. The first case 7-230 may be connected to the first movable portion 7-218 through a first rotational shaft, and the holding portion 7-235 is movably disposed in the first case 7-230 and connected to the second movable portion 7-228 through a second rotational shaft. The first optical element 7-233 is affixed on the first case 7-230, and the second optical element 7-234 is affixed on the holding portion 7-235. Moreover, as shown in FIG. 3A, the first case 7-230 may have a light opening 7-230A, and light is allowed to enter the first case 7-230 through the light opening 7-230A.

The first case 7-230 may be disposed on the second case 7-240, and may rotate relative to the second case 7-240 by the first rotational shaft 7-231 and the second rotational shaft 7-232. A space may form between the second case 7-240 and the top cover 7-270, and the second optical module 7-300, the first circuit element 7-251, and the second circuit element 7-252 may be disposed in the space.

In some embodiments, the first circuit element 7-251 and the second circuit element 7-252 may be, for example, circuit boards, and the first circuit element 7-251 and the second circuit element 7-252 may arranged along the main axis 7-O (sixth direction 7-D6, which will be described later). The first circuit element 7-251 and the second circuit element 7-252 may be plate-shaped and parallel each other. Furthermore, as shown in FIG. 4, the first circuit element 7-251 is closer than the second optical module 7-300 than the second circuit element 7-252.

The spacer 7-260 may be disposed between the first circuit element 7-251 and the second circuit element 7-252 to separate the first circuit element 7-251 and the second circuit element 7-252. In other words, a gap is formed between the first circuit element 7-251 and the second circuit element. The interference-suppressing element 7-500 (FIG. 3A and FIG. 3B) may be disposed on the first circuit element 7-251, and may be disposed between the first circuit element 7-251 and the second circuit element 7-252 to prevent the signal of the elements disposed on first circuit element 7-251 and the second circuit element 7-252 from interference. For example, the interference-suppressing element 7-500 may be disposed between a position sensor 7-501 and the second circuit element 7-252.

A control element 7-502, a wireless communication element 7-504, a passive electronic element 7-506, and a power source 7-508 may be disposed on the second circuit element 7-252, but the present disclosure is not limited thereto. The positions of the elements may be adjusted based on actual requirement. The control element 7-502 may be used for controlling the driving assembly. The wireless communication element 7-504 may be used for controlling the optical system 7-1 in a wireless manner, such as used for emitting a signal to an external apparatus. The passive electronic element 7-506 may be, for example, a capacitor, a resistor, or an inductor. The power source 7-508 may be, for example, a battery, and is used for providing power to the first driving assembly 7-210, the second driving assembly 7-220, and the fourth driving assembly 7-350.

In some embodiments, a third rotational shaft 7-272 may extend from the top cover 7-270 and be disposed in the third movable portion 7-408, so that the top cover 7-270 may move together with the third movable portion 7-408. The embodiments that the top cover 7-270 moves together with the third movable portion 7-408 will be described later. Furthermore, a bearing 7-276 may be disposed on the third rotational shaft 7-272 to reduce the rotational friction. In some embodiments, a snap 7-274 may be designed on the top cover 7-270, and an opening 7-242 may be designed on the second case 7-240, so that the top cover 7-270 may be affixed on the second case 7-240 by disposing the snap 7-274 in the opening 7-242.

In some embodiments, as shown in FIG. 4, a first direction 7-D1 may be defined as the extending direction of the first rotational shaft 7-231, a second direction 7-D2 may be defined as the extending direction of the first transmission element 7-214, and a third direction 7-D3 may be defined as the extending direction of the second transmission element 7-224. The second direction 7-D2 may be parallel to the third direction 7-D3.

Figure 5B:
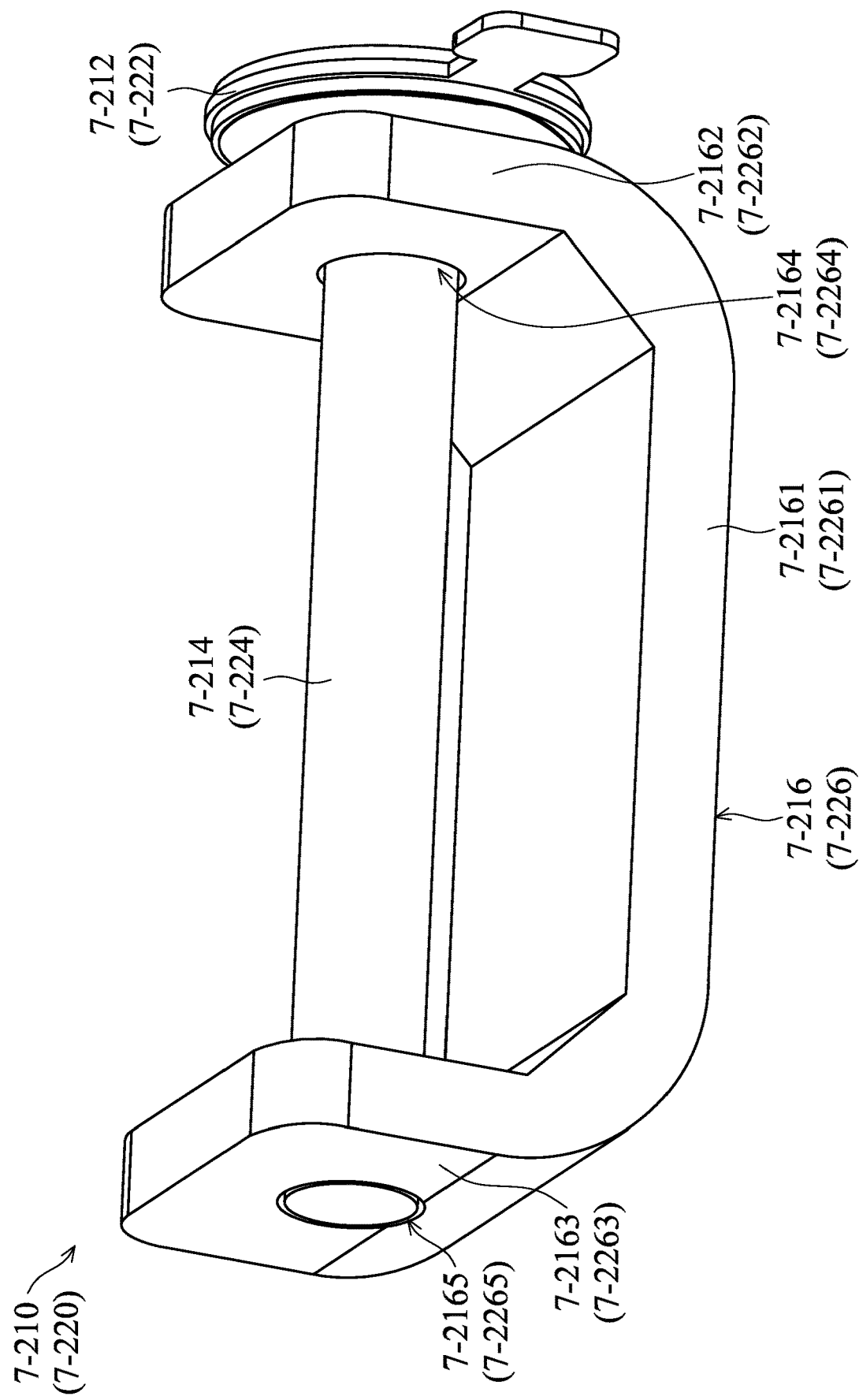
FIG. 5B is a schematic view of the first driving assembly or the second driving assembly.

FIG. 5B is a schematic view of the first driving assembly 7-210 or the second driving assembly 7-220. FIG. 5C is a top view of the first driving assembly 7-210 or the second driving assembly 7-220, and an additional first pressing assembly 7-211 or a second pressing 7-221 is illustrated in FIG. 5C.

The first frame 7-216 mainly includes a first main body 7-2161, and a first leaning portion 7-2162 and a second leaning portion 7-2163 extending from the first main body 7-2161. The first leaning portion 7-2162 may have a first through hole 7-2164. The second leaning portion 7-2163 may have a second through hole 7-2165. The first leaning portion 7-2162 and the second leaning portion 7-2163 may correspond to the first pressing assembly 7-211.

For example, as shown in FIG. 5C, the first leaning portion 7-2162 and the second leaning portion 7-2163 may in direct contact with the first pressing element 7-213 to allow a first pressure 7-P1 applied by the first pressing element 7-213 to the first frame 7-216 through the first leaning portion 7-2162 and the second leaning portion 7-2163. The direction of the first pressure 7-P1 is not parallel to the first direction 7-D1, so that the first driving assembly 7-210 and the first movable portion 7-218 are arranged in the direction of the first pressure 7-P1.

The first leaning portion 7-2162 and the second leaning portion 7-2163 are arranged parallel to the extending direction of the first transmission element 7-214. In some embodiments, the first pressing element 7-213 is disposed on a first column 7-244 extending from the first case 7-230 and disposed on the first adjusting element 7-215. The first adjusting element 7-215 is disposed on a second column 7-245 extending from the first case 7-230. The first adjusting element 7-215 may have thread to lock on the second column 7-245, and may be used for adjusting the relative position of the first adjusting element 7-215 and the second column 7-245, so as to adjust the amount or direction of the first pressure 7-P1.

Figure 5D:
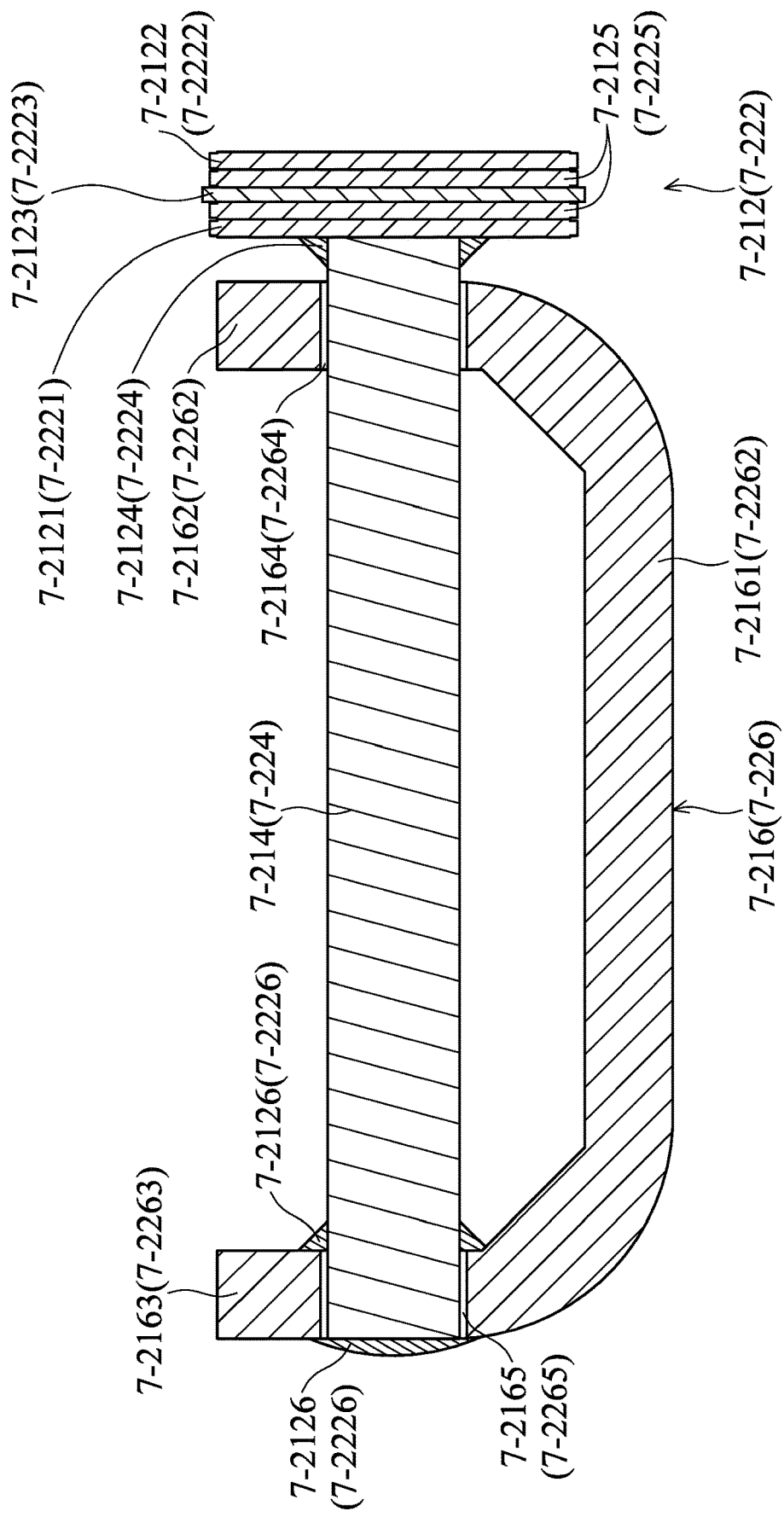
FIG. 5D is a cross-sectional view of the first driving assembly or the second driving assembly.

FIG. 5D is a cross-sectional view of the first driving assembly 7-210 or the second driving assembly. As shown in FIG. 5D, the first driving source 7-212 may be affixed on the first transmission element 7-214, such as affixed on the first transmission element 7-214 by a first bonding element 7-2124. In some embodiments, the first driving source 7-212 may include a first piezoelectric element 7-2121, a second piezoelectric element 7-2122, and a first resilient element 7-2123. The first resilient element 7-2123 may be disposed between the first piezoelectric element 7-2121 and the second piezoelectric element 7-2122, and may be affixed on the first piezoelectric element 7-2121 and the second piezoelectric element 7-2122. In other words, the second bonding element 7-2125 may be disposed on opposite sides of the first resilient element 7-2123.

However, the present disclosure is not limited thereto. For example, in some embodiments, the second piezoelectric element 7-2122 and the second bonding element 7-2125 disposed between the second piezoelectric element 7-2122 and the first resilient element 7-2123 may be omitted, depending on design requirement. Furthermore, a first circuit 7-219 (FIG. 4) may be electrically connected to the first driving assembly 7-210 and the first circuit element 7-251 to allow the electronic elements disposed on the first circuit element 7-251 provide electrical signal to the first driving assembly 7-210.

In some embodiments, the first piezoelectric element 7-2121 and the second piezoelectric element 7-2122 may be formed form piezoelectric materials. In other words, if an electrical field (voltage) is applied on the surface of the first piezoelectric element 7-2121 or the second piezoelectric element 7-2122, the electric dipole moment of the first piezoelectric element 7-2121 or the second piezoelectric element 7-2122 may be elongated, and the first piezoelectric element 7-2121 or the second piezoelectric element 7-2122 may be elongated along the electric field to resist the change. As a result, electric energy may be converted into mechanical energy. In some embodiments, the first piezoelectric element 7-2121 or the second piezoelectric element 7-2122 may deform to move the first transmission element 7-214 in the second direction 7-D2.

Moreover, as shown in FIG. 5C and FIG. 5D, the first transmission element 7-214 may be disposed on the first frame 7-216. For example, the first transmission element 7-214 may penetrate the first through hole 7-2164 and the second through hole 7-2165, and a third bonding element 7-2126 may be provided between the first transmission element 7-214 and the second through hole 7-2165 to bond the first transmission element 7-214 and the second through hole 7-2165. Therefore, the first transmission element 7-214 may move together with the first frame 7-216. Although the first through hole 7-2164 and the second through hole 7-2165 are designed on the first frame 7-216, depending on design requirement, the first through hole 7-2164 and the second through hole 7-2165 may be replaced by other structures that the first transmission element 7-214 may be disposed therein, such as recesses.

In some embodiments, the Young's modulus of the first bonding element 7-2124 is greater than the Young's modulus of the second bonding element 7-2125, and the Young's modulus of the second bonding element 7-2125 is greater than the Young's modulus of the third bonding element 7-2126. In other words, the Young's modulus of the first bonding element 7-2124 is greater than the Young's modulus of the third bonding 7-2126.

For example, the relative positions of the first driving source 7-212 and the first transmission element 7-214 that are bonded by the first bonding element 7-2124 may be fixed, and the relative positions of the first piezoelectric element 7-2121, the second piezoelectric element 7-2122, and the first resilient element 7-2123 that are bonded by the second bonding element 7-2125 and the relative positions of the first transmission element 7-214 and the first frame 7-216 that are bonded by the third bonding element 7-2126 may be changed, so that the first transmission element 7-214 is allowed to move in the second direction 7-D2.

The second frame 7-226 mainly includes a second main body 7-2261, and a third leaning portion 7-2262 and a fourth leaning portion 7-2263 extending from the second main body 7-2261. The third leaning portion 7-2262 may have a third through hole 7-2264. The fourth leaning portion 7-2263 may have a fourth through hole 7-2265. The third leaning portion 7-2262 and the fourth leaning portion 7-2263 may correspond to the second pressing assembly 7-221.

For example, as shown in FIG. 5C, the third leaning portion 7-2262 and the fourth leaning portion 7-2263 may in direct contact with the second pressing element 7-223 to allow a second pressure 7-P2 applied by the second pressing element 7-223 to the second frame 7-226 through the third leaning portion 7-2262 and the fourth leaning portion 7-2263. The direction of the second pressure 7-P2 is not parallel to the first direction 7-D1, so that the second driving assembly 7-220 and the second movable portion 7-228 are arranged in the direction of the second pressure 7-P2.

The third leaning portion 7-2262 and the fourth leaning portion 7-2263 are arranged parallel to the extending direction of the second transmission element 7-224. In some embodiments, the second pressing element 7-223 is disposed on a third column 7-246 extending from the first case 7-230 and disposed on the second adjusting element 7-225. The second adjusting element 7-225 is disposed on a fourth column 7-247 extending from the first case 7-230. The second adjusting element 7-225 may have thread to lock on the fourth column 7-247, and may be used for adjusting the relative position of the second adjusting element 7-225 and the fourth column 7-247, so as to adjust the amount or direction of the second pressure 7-P2.

As shown in FIG. 5D, the second driving source 7-222 may be affixed on the second transmission element 7-224, such as affixed on the second transmission element 7-224 by a fourth bonding element 7-2224. In some embodiments, the second driving source 7-222 may include a third piezoelectric element 7-2221, a fourth piezoelectric element 7-2222, and a second resilient element 7-2223. The second resilient element 7-2223 may be disposed between the third piezoelectric element 7-2221 and the fourth piezoelectric element 7-2222, and may be affixed on the third piezoelectric element 7-2221 and the fourth piezoelectric element 7-2222. In other words, the fifth bonding element 7-2225 may be disposed on opposite sides of the second resilient element 7-2223.

However, the present disclosure is not limited thereto. For example, in some embodiments, the fourth piezoelectric element 7-2222 and the fifth bonding element 7-2225 disposed between the fourth piezoelectric element 7-2222 and the second resilient element 7-2223 may be omitted, depending on design requirement. Furthermore, a second circuit 7-229 (FIG. 4) may be electrically connected to the second driving assembly 7-220 and the first circuit element 7-251 to allow the electronic elements disposed on the first circuit element 7-251 provide electrical signal to the second driving assembly 7-220.

In some embodiments, the third piezoelectric element 7-2221 and the fourth piezoelectric element 7-2222 may be formed form piezoelectric materials. In other words, if an electrical field (voltage) is applied on the surface of the third piezoelectric element 7-2221 or the fourth piezoelectric element 7-2222, the electric dipole moment of the third piezoelectric element 7-2221 or the fourth piezoelectric element 7-2222 may be elongated, and the third piezoelectric element 7-2221 or the fourth piezoelectric element 7-2222 may be elongated along the electric field to resist the change. As a result, electric energy may be converted into mechanical energy. In some embodiments, the third piezoelectric element 7-2221 or the fourth piezoelectric element 7-2222 may deform to move the second transmission element 7-224 in the third direction 7-D3.

Moreover, as shown in FIG. 5C and FIG. 5D, the second transmission element 7-224 may be disposed on the second frame 7-226. For example, the second transmission element 7-224 may penetrate the third through hole 7-2264 and the fourth through hole 7-2265, and a sixth bonding element 7-2226 may be provided between the second transmission element 7-224 and the fourth through hole 7-2265 to bond the second transmission element 7-224 and the fourth through hole 7-2265. Therefore, the second transmission element 7-224 may move together with the second frame 7-226. Although the third through hole 7-2264 and the fourth through hole 7-2265 are designed on the second frame 7-226, depending on design requirement, the third through hole 7-2264 and the fourth through hole 7-2265 may be replaced by other structures that the second transmission element 7-224 may be disposed therein, such as recesses.

In some embodiments, the Young's modulus of the fourth bonding element 7-2224 is greater than the Young's modulus of the fifth bonding element 7-2225, and the Young's modulus of the fifth bonding element 7-2225 is greater than the Young's modulus of the sixth bonding element 7-2226. In other words, the Young's modulus of the fourth bonding element 7-2224 is greater than the Young's modulus of the sixth bonding element 7-2226.

For example, the relative positions of the second driving source 7-222 and the second transmission element 7-224 that are bonded by the fourth bonding element 7-2224 may be fixed, and the relative positions of the third piezoelectric element 7-2221, the fourth piezoelectric element 7-2222, and the second resilient element 7-2223 that are bonded by the fifth bonding element 7-2225 and the relative positions of the second transmission element 7-224 and the second frame 7-226 that are bonded by the sixth bonding element 7-2226 may be changed, so that the second transmission element 7-224 is allowed to move in the third direction 7-D3.

The first driving assembly 7-210 may be used for rotate the first case 7-230 relative to the fixed portion 7-100, and the first rotational shaft 7-230 that is disposed on the first movable portion 7-218 acts as the rotational axis. For example, as shown in FIG. 5A, the first transmission element 7-214 of the first driving assembly 7-210 may be disposed in the recess of the first movable portion 7-218 by friction contact. In other words, the maximum static friction between the first transmission element 7-214 and the first movable portion 7-218 fixes their relative position.

The second driving assembly 7-220 may be used for rotate the holding portion 7-235 relative to the fixed portion 7-100, and the second rotational shaft 7-232 that is disposed on the second movable portion 7-228 acts as the rotational axis. For example, as shown in FIG. 5A, the second transmission element 7-224 of the second driving assembly 7-220 may be disposed in the recess of the second movable portion 7-228 by friction contact. In other words, the maximum static friction between the second transmission element 7-224 and the second movable portion 7-228 fixes their relative position.

The first pressure 7-P1 applied by the first pressing assembly 7-211 to the first transmission element 7-214 through the first frame 7-216 may be adjusted to adjust the friction between the first transmission element 7-214 and the first movable portion 7-218. Furthermore, the first transmission element 7-214 may be moved by the first driving source 7-212, so if a first electrical signal that is weaker is provided to the first driving source 7-212, the moving speed of the first transmission element 7-214 will be slower as well. Therefore, the force between the first transmission element 7-214 and the first movable portion 7-218 will not be greater than their maximum static friction, and the first movable portion 7-218 may move together with the first transmission element 7-214. In other words, the first movable portion 7-218 may rotate relative to the first rotational shaft 7-231.

Afterwards, if a stronger second electrical signal is provided to the first driving source 7-212, the moving speed of the first transmission element 7-214 may be higher to let the force between first transmission element 7-214 and the first movable portion 7-218 greater than their maximum static friction. As a result, the first transmission element 7-214 may move relative to the first movable portion 7-218. In other words, when the first transmission element 7-214 moves, the first movable portion 7-218 does not rotate with the first transmission element 7-214.

The first movable portion 7-218 may rotate in a specific direction by repeating the aforementioned steps, so that the first optical element 7-233 which is disposed on the first case 7-230 may rotate accordingly. Moreover, the secpmd movable portion 7-228 may rotate in a specific direction by repeating the aforementioned steps, so that the second optical element 7-234 which is disposed on the holding portion 7-235 may rotate accordingly based on similar principle.

A first driving force may be generated by the first driving source 7-212, a second driving force may be generated by the second driving source 7-222, and the direction of the first driving force (second direction 7-D2) is parallel to the direction of the second driving force (third direction 7-D3). Therefore, the first optical element 7-233 and the second optical element 7-234 may rotate about the first rotational shaft 7-231 and the second rotational shaft 7-232, respectively. The rotation of the first optical element 7-233 and the second optical element 7-234 may be independently controlled by the first driving assembly 7-210 and the second driving assembly 7-220 to further adjust the light path incident on the first optical element 7-233 and the second optical element 7-234.

Figure 5E:
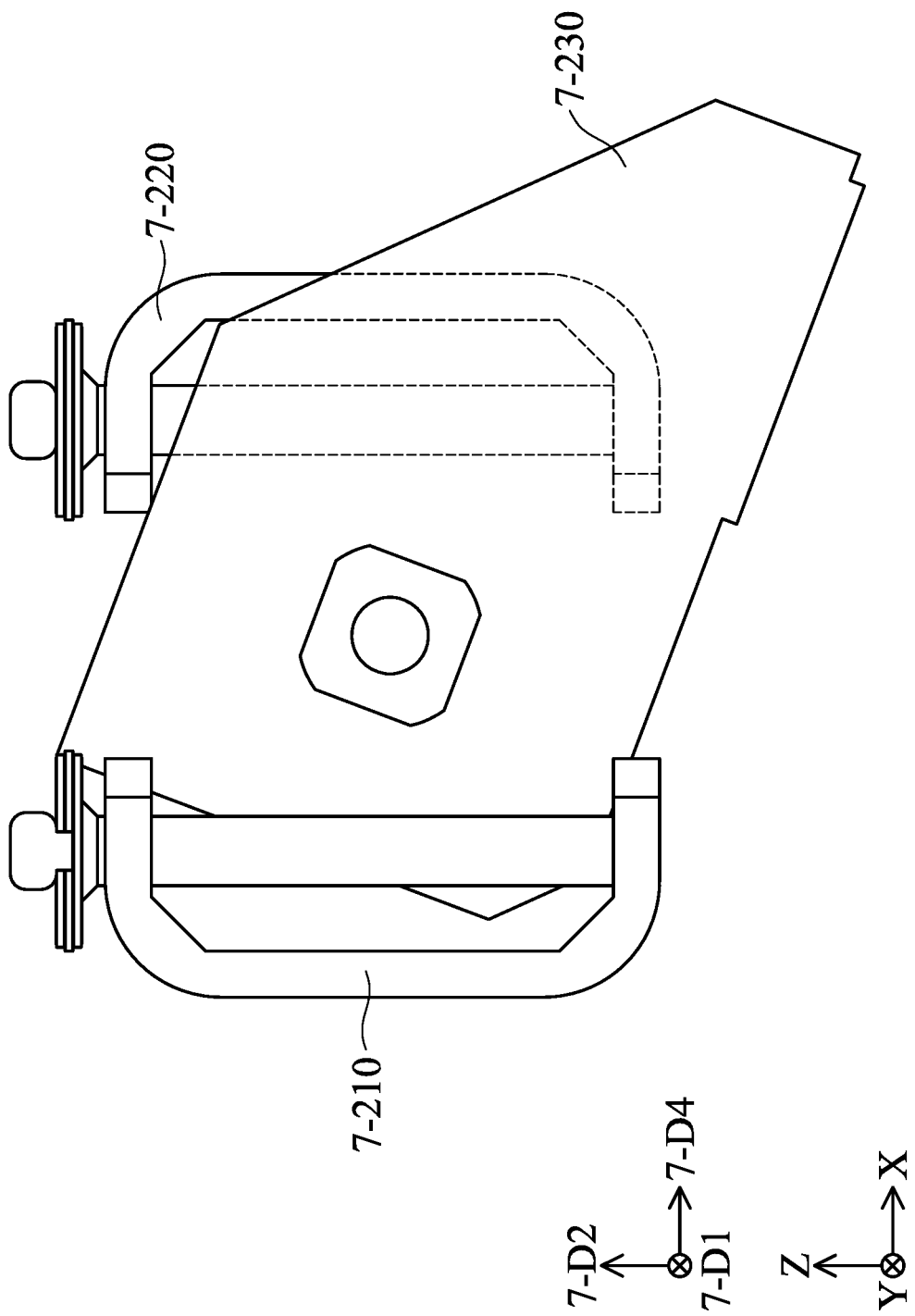
FIG. 5E is a schematic view of the first driving assembly, the second driving assembly, and the first case when viewed in a first direction.
Figure 5F:
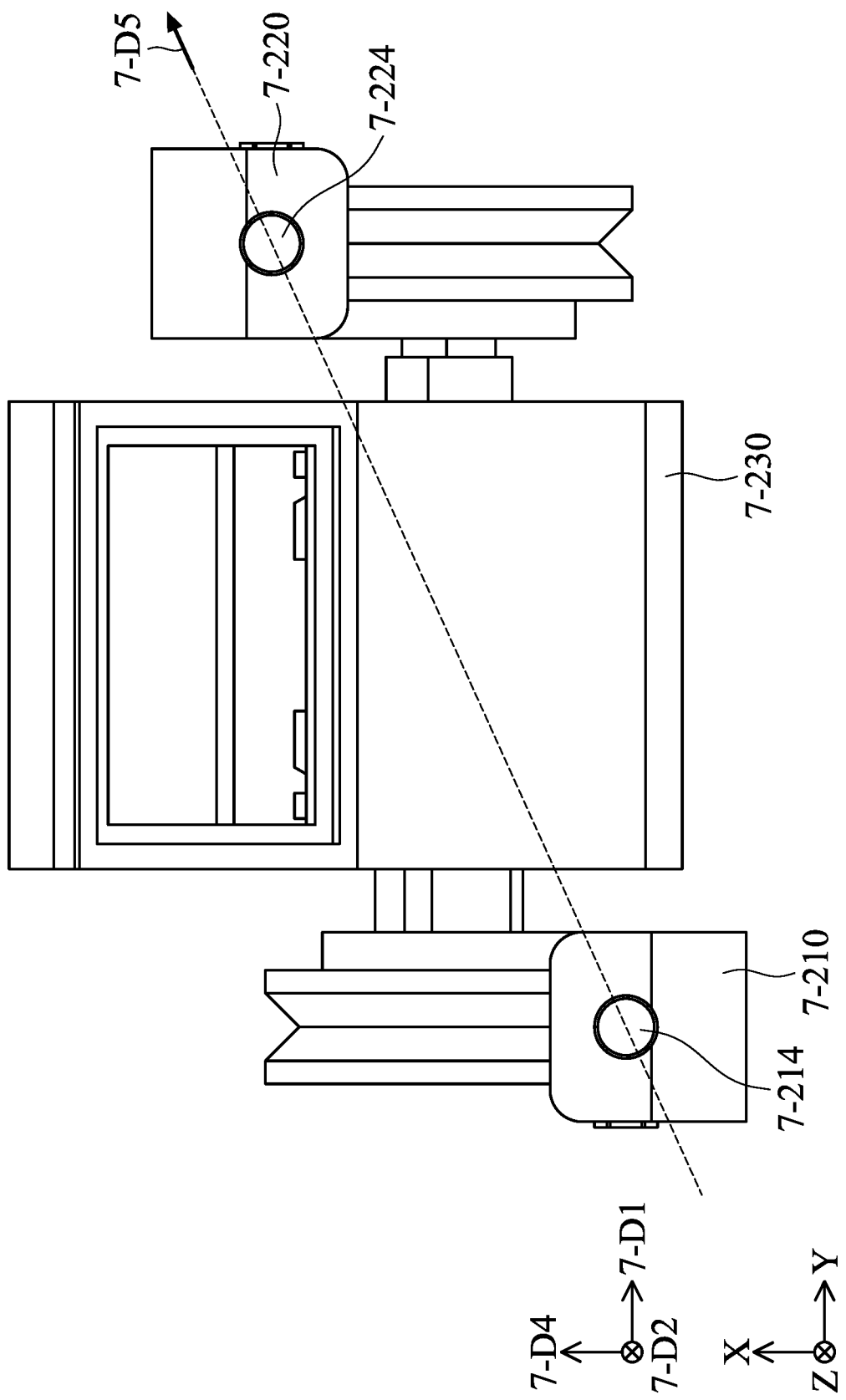
FIG. 5F is a schematic view of the first driving assembly, the second driving assembly, and the first case when viewed in a second direction.
Figure 5G:
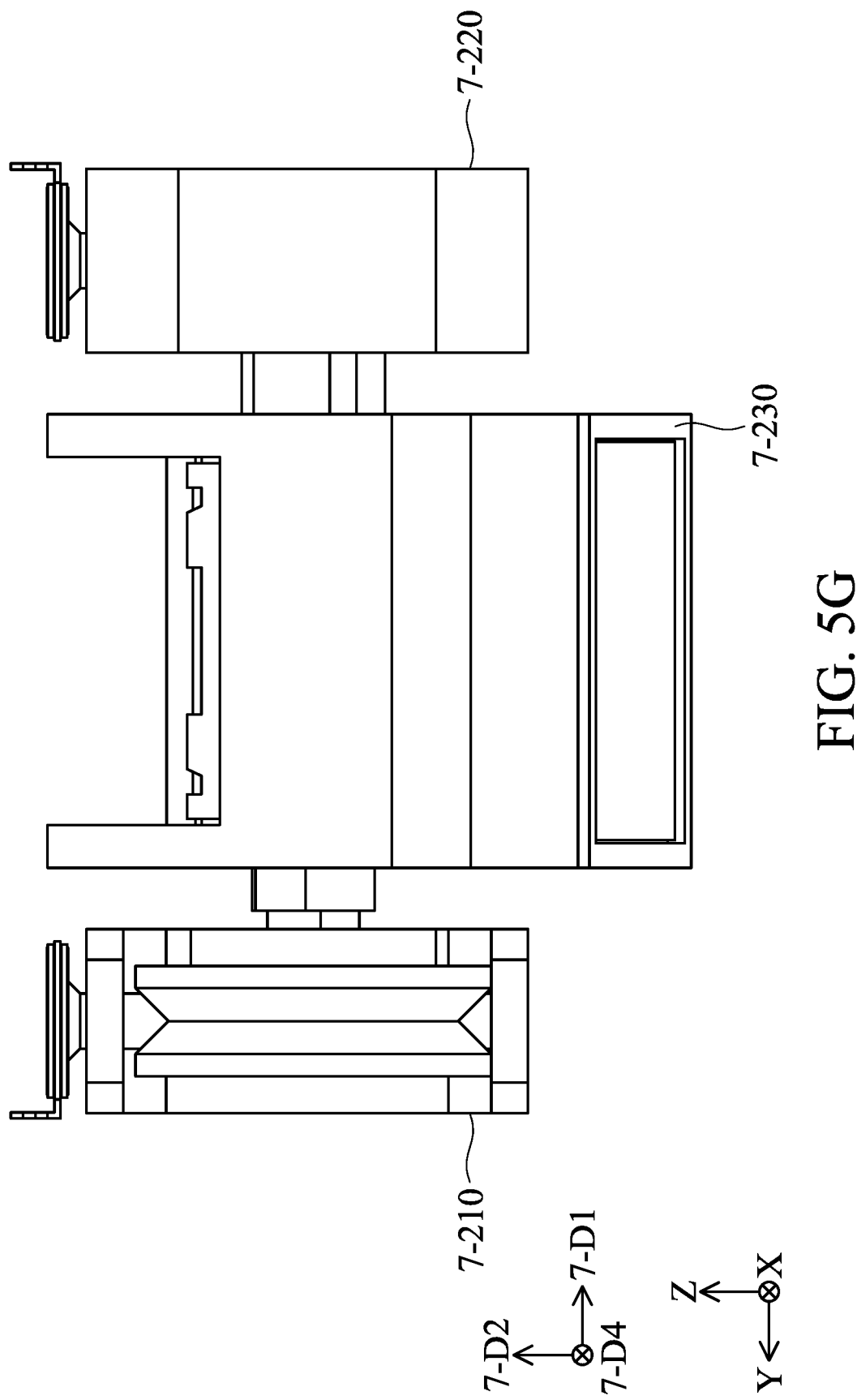
FIG. 5G is a schematic view of the first driving assembly, the second driving assembly, and the first case when viewed in a fourth direction.

In some embodiments, a direction that is perpendicular to the aforementioned first direction 7-D1, second direction 7-D2 may be defined as a fourth direction 7-D4. FIG. 5E is a schematic view of the first driving assembly 7-210, the second driving assembly 7-220, and the first case 7-230 when viewed along the first direction 7-D1. FIG. 5F is a schematic view of the first driving assembly 7-210, the second driving assembly 7-220, and the first case 7-230 when viewed along the second direction 7-D2. FIG. 5G is a schematic view of the first driving assembly 7-210, the second driving assembly 7-220, and the first case 7-230 when viewed along the fourth direction 7-D4. As shown in FIG. 5E to FIG. 5G, when viewed along the first direction 7-D1, the second direction 7-D2, and the fourth direction 7-D4, the first driving assembly 7-210 and the second driving assembly 7-220 does not overlap each other.

In addition, as shown in FIG. 5F, when viewed along the second direction 7-D2, the first transmission element 7-214 of the first driving assembly 7-210 and the second transmission element 7-224 of the second driving assembly 7-220 are arranged in a fifth direction 7-D5. In other words, the connection direction of the center of the first transmission element 7-214 and the second transmission element 7-224 is the fifth direction 7-D5. The fifth direction 7-D5 is not parallel to the first direction 7-D1, the second direction 7-D2, the third direction 7-D3, and the fourth direction 7-D4, and is not perpendicular to the first direction 7-D1 and the fourth direction 7-D4. In addition, the first case 7-230 is also aligned with the first driving assembly 7-210 and the second driving assembly 7-220 in the fifth direction 7-D5. Thereby, the size of the optical system 7-1 in a specific direction may be reduced to achieve miniaturization.

In some embodiments, a position sensing assembly (not shown) may be provided to sense the movement of the first movable portion 7-218 or the second movable portion 7-228 relative to the fixed portion 7-100. For example, a sensing magnet may be provided on the first movable portion 7-218 or the second movable portion 7-228, and a sensing element may be provided on the first circuit element 7-251. The first driving assembly 7-210 or the second driving assembly 7-220 may be controlled by the sensed position signal, so as to stop driving the first driving assembly 7-210 or the second driving assembly 7-220 when the first movable part 7-218 or the second movable part 7-228 reaches the desired position. The aforementioned sensing element may include a Hall sensor, a Magnetoresistance Effect sensor (MR Sensor), a Giant Magnetoresistance Effect sensor (GMR Sensor), a Tunneling Magnetoresistance Effect sensor (TMR Sensor), or a Fluxgate sensor.

Figure 6:
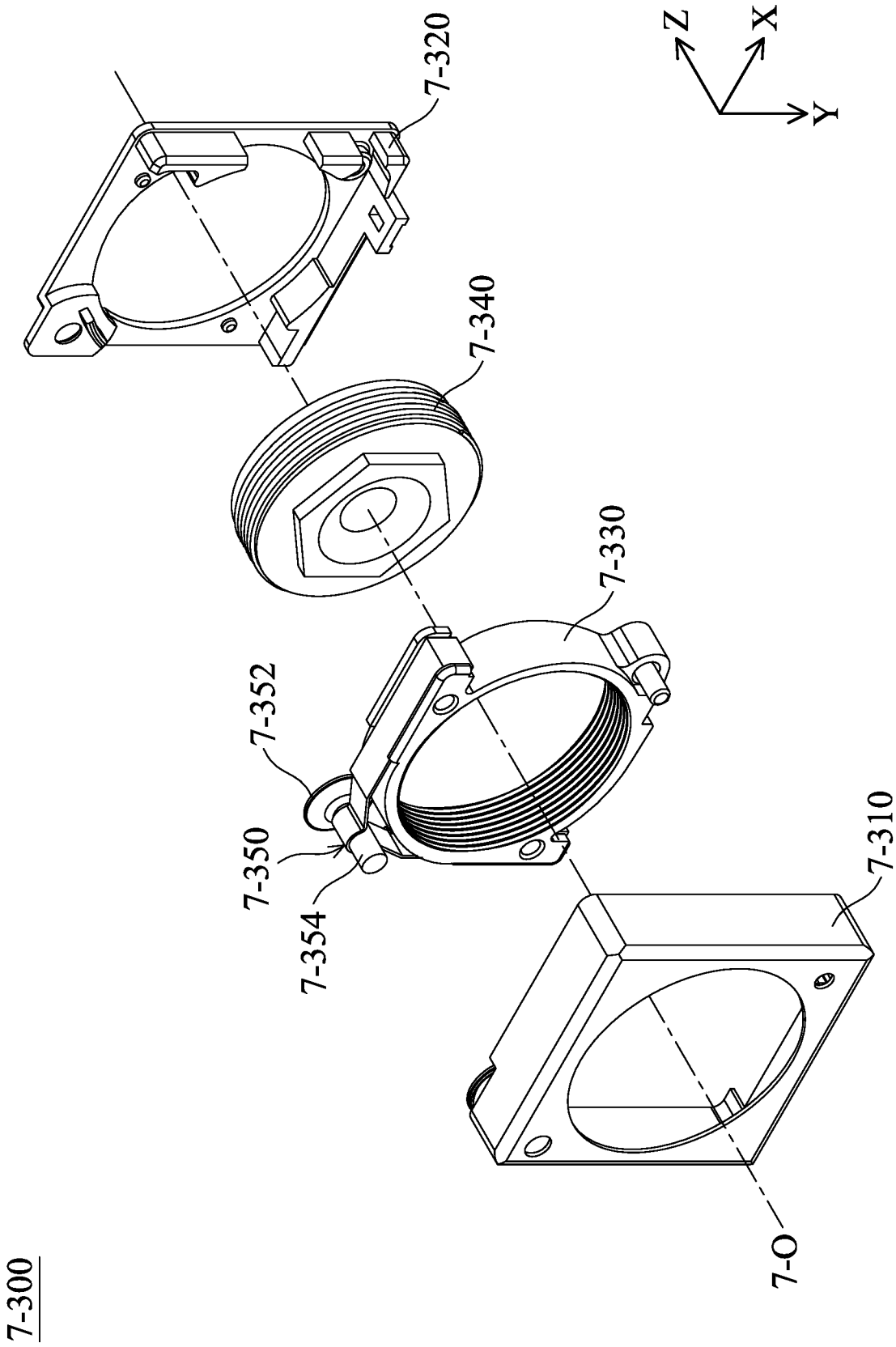
FIG. 6 is an exploded view of the second optical module.

FIG. 6 is an exploded view of the second optical module 7-300. The second optical module 7-300 may include a case 7-310, a base 7-320, a holder 7-330, a lens 7-340, and a fourth driving assembly 7-350. As shown in FIG. 6, the case 7-310 and the base 7-320 may be combined with each other to form a housing of the second optical module 7-300. The holder 7-330 may be disposed between the case 7-310 and the base 7-320, and the lens 7-340 may be affixed (e.g., locked) on the holder 7-330. The fourth driving assembly 7-350 may include a fourth driving source 7-352 and a fourth transmission element 7-354. The structure and operation principle of the fourth driving assembly 7-350 is similar to the foregoing first driving assembly 7-210 and second driving assembly 7-220, and will not be repeated here.

The fourth transmission element 7-352 may be disposed on the holder 7-330 by frictional contact. Thereby, the bearing 7-330 may be driven to move in the direction of the main axis 7-0 by the fourth driving assembly 7-350, and the lens 7-340 is driven together to move in the direction of the main axis 7-0 to achieve auto focus (AF).

Figure 7A:
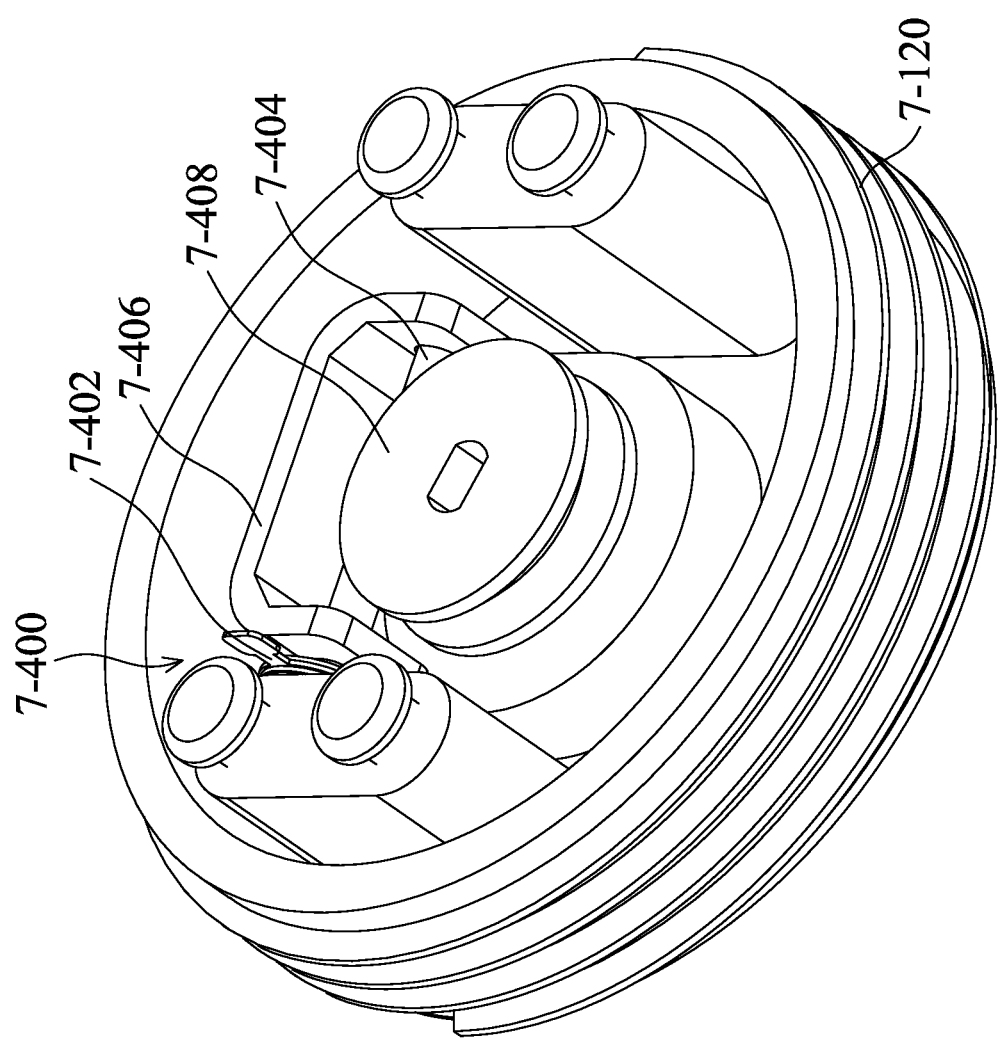
FIG. 7A is a schematic view of some elements of the optical system.
Figure 7B:
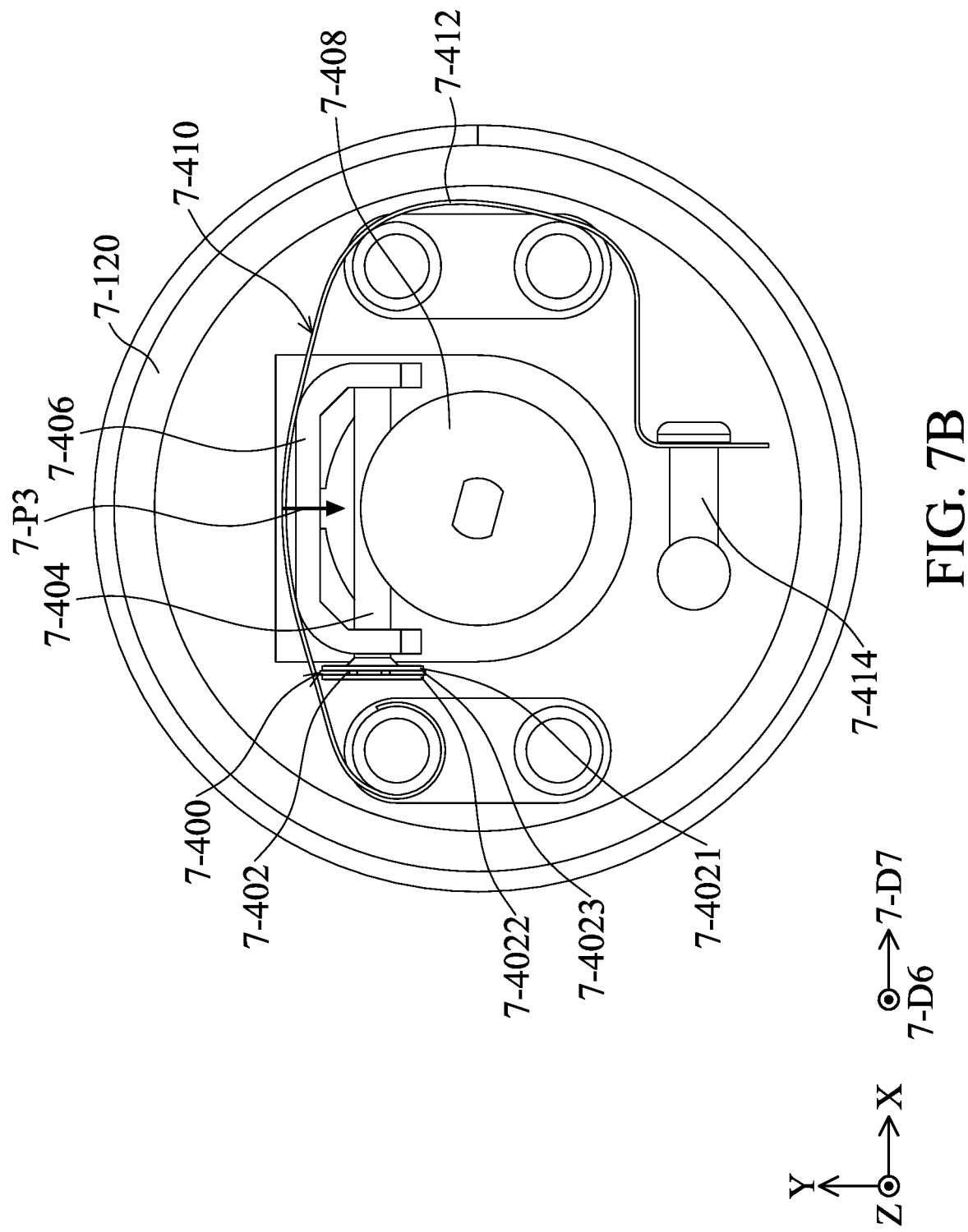
FIG. 7B is a top view of some elements of the optical system.

FIG. 7A is a schematic view of the second fixed portion 7-120, and the third driving assembly 7-400 and the third movable portion 7-404 disposed on the second fixed portion 7-120. FIG. 7B is a top view of the aforementioned elements, in which a third pressing assembly 7-410 is shown in FIG. 7B, and is omitted in FIG. 7A for simplicity.

The structure of the third driving assembly 7-400 may be similar to the aforementioned first driving assembly 7-210 or the second driving assembly 7-220. For example, the third driving assembly 7-400 may also include a third driving source 7-402, a third transmission element 7-404, a third frame 7-406. The third driving source 7-402 may include a combination of a fifth piezoelectric element 7-4021, a sixth piezoelectric element 7-4022, and a third resilient element 7-4023. The third driving source 7-402 is used to generate a third driving force toward the extending direction of the third transmission element 7-404. The details of the positional relationship will not be repeated here.

The third driving assembly 7-400 is used to drive the third movable portion 7-408 to rotate relative to the second fixed portion 7-120 with a rotation axis extending in a sixth direction 7-D6. The direction in which the third transmission element 7-404 extends may be defined as the seventh direction 7-D7, where the sixth direction 7-D6 is not parallel to the seventh direction 7-D7.

In addition, the third pressing assembly 7-410 may include a third pressing element 7-412 and a third adjusting element 7-414, the principle of which is similar as the first pressing assembly 7-211 or the second pressing assembly 7-221 and will not be repeated here. The third pressing assembly 7-410 may apply a third pressure 7-P3 to the third driving assembly 7-400, and the third driving assembly 7-400 and the third movable portion 7-408 are arranged along the direction of the third pressure 7-P3.

Figure 8:
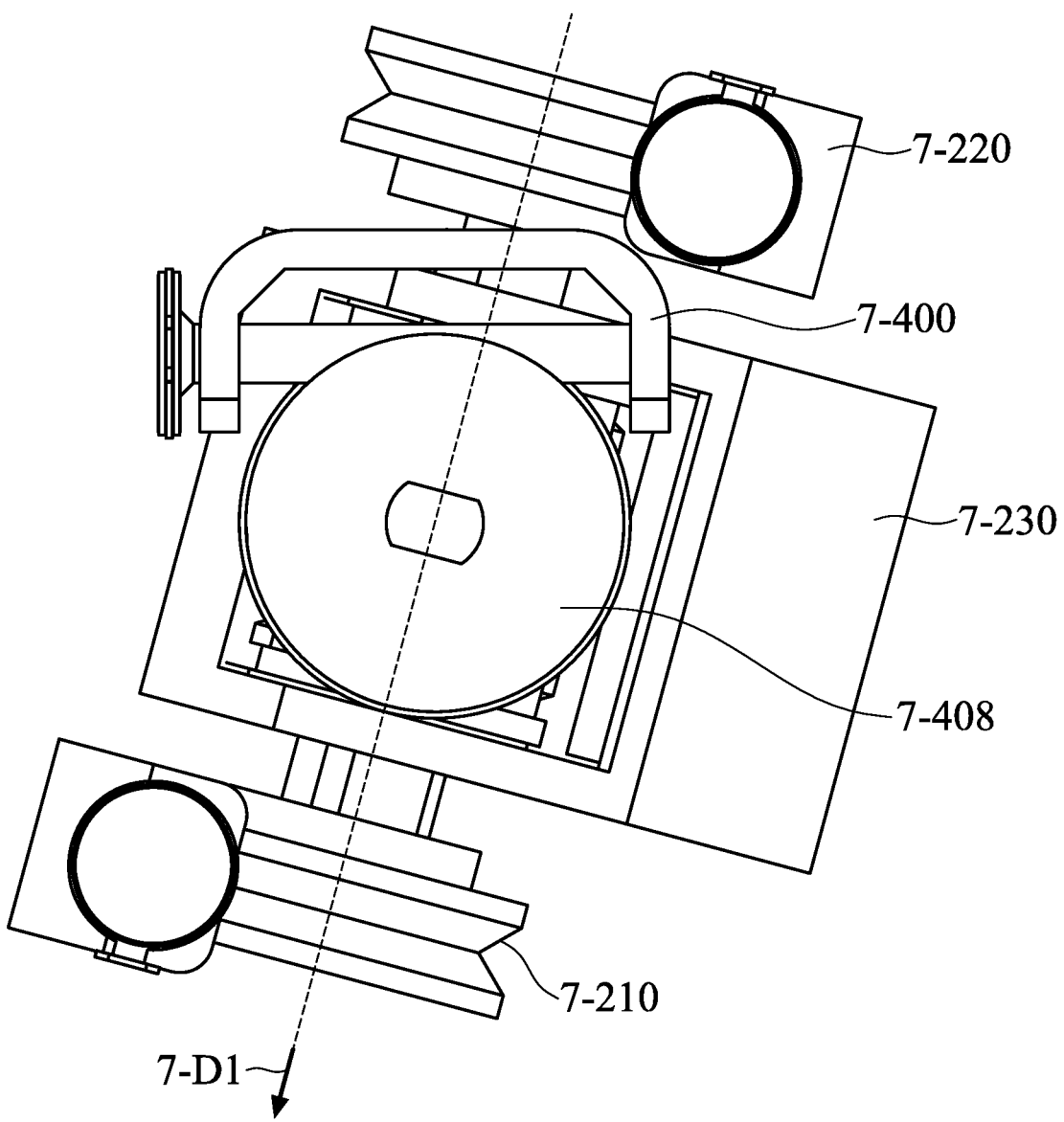
FIG. 8 is a schematic view of some elements of the optical system when viewed in a sixth direction.

As shown in FIG. 7B, the direction of the third pressure 7-P3 is not parallel to the sixth direction 7-D6. In addition, FIG. 8 is a schematic view of some elements of the optical system 7-1 when viewed from the sixth direction 7-D6. As shown in FIG. 8, the first direction 7-D1 and the sixth direction 7-D6 are not parallel. In other words, the directions of the rotation axes of the first movable portion 7-218 and the third movable portion 7-408 are different.

In addition, in some embodiments, a plane parallel to both the first direction 7-D1 and the seventh direction 7-D7 may be defined as an imaginary plane (not shown), and the imaginary plane is perpendicular to the sixth direction 7-D6. As shown in FIG. 8, when viewed along the sixth direction 7-D6, the third driving assembly 7-400 and the first driving assembly 7-210 do not overlap each other, and the third driving assembly 7-400 and the second driving assembly 7-220 do not overlap each other. Therefore, the size of the optical system 7-1 in a specific direction may be reduced to achieve miniaturization.

Refer back to FIG. 3A and FIG. 3B. The third rotational shaft 7-272 on the top cover 7-270 may be disposed in the third movable portion 7-408 to allow the third driving assembly 7-400 rotate the top cover 7-270 and the second housing 7-240 fixed to the top cover 7-270 along the main axis 7-0 through the third movable portion 7-408. The first driving assembly 7-210 and the second driving assembly 7-220 disposed on the second case 7-240 are also driven to rotate together, that is, the first driving assembly 7-210 and the second driving assembly 7-220 may move relative to the third driving assembly 7-400. In some embodiments, a position sensor (not shown) may be provided to sense the movement of the third movable portion 7-408 relative to the second fixed portion 7-120.

In addition, a third circuit element 7-420 may be provided on the second fixed portion 7-120. The third circuit element 7-420 may be, for example, a circuit board, which may be electrically connected to the third driving assembly 7-400. A position sensing element (not shown) may be provided on the third circuit element 7-420, and a sensed magnet (not shown) may be provided on the third movable portion 7-408 to sense the position of the third movable portion 7-408 by sensing the magnetic field change of the sensed magnet, so as to control the third driving assembly 7-400.

Figure 9A:
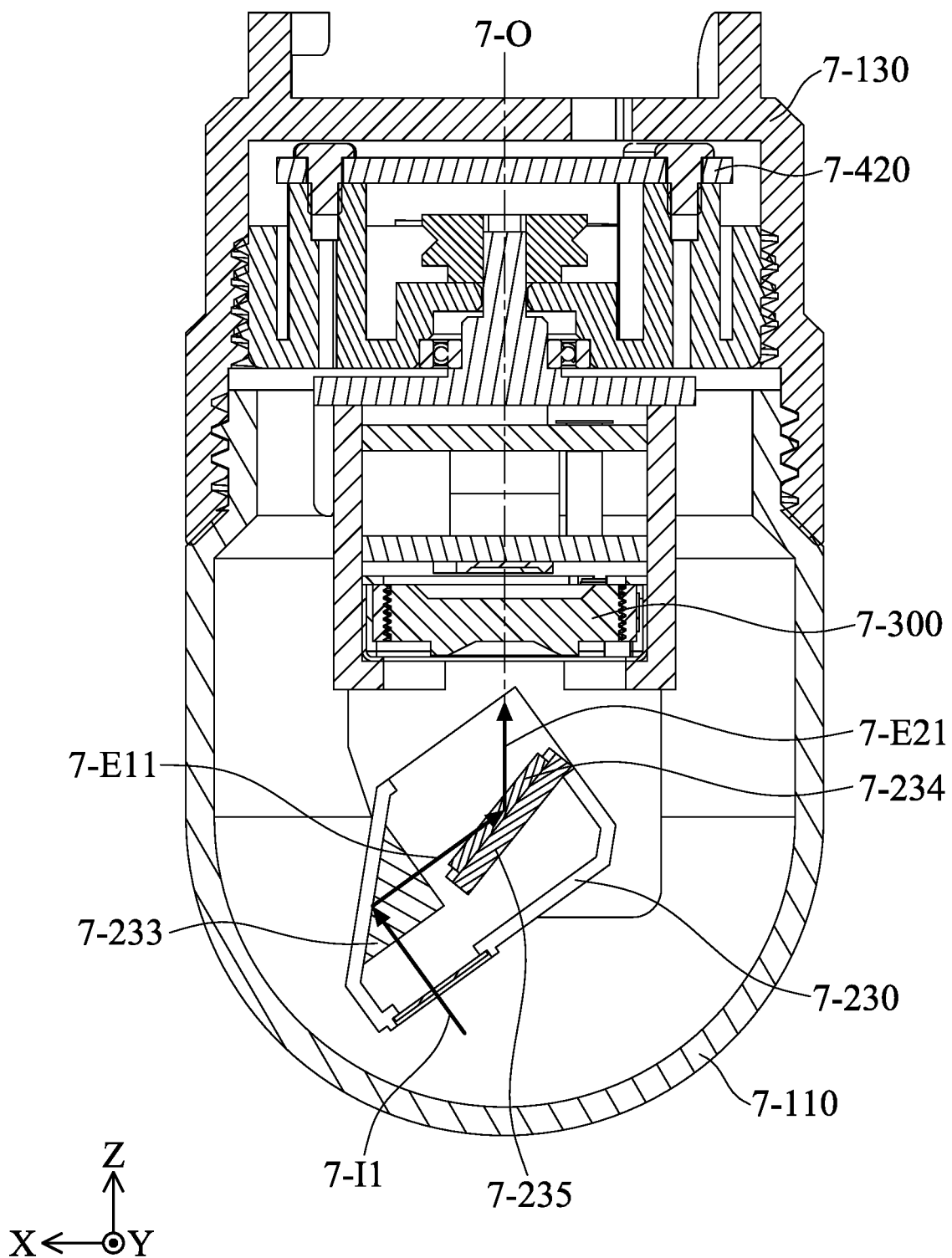
FIG. 9A, FIG. 9B, and FIG. 9C are schematic views showing the operation of the optical system.
Figure 9B:
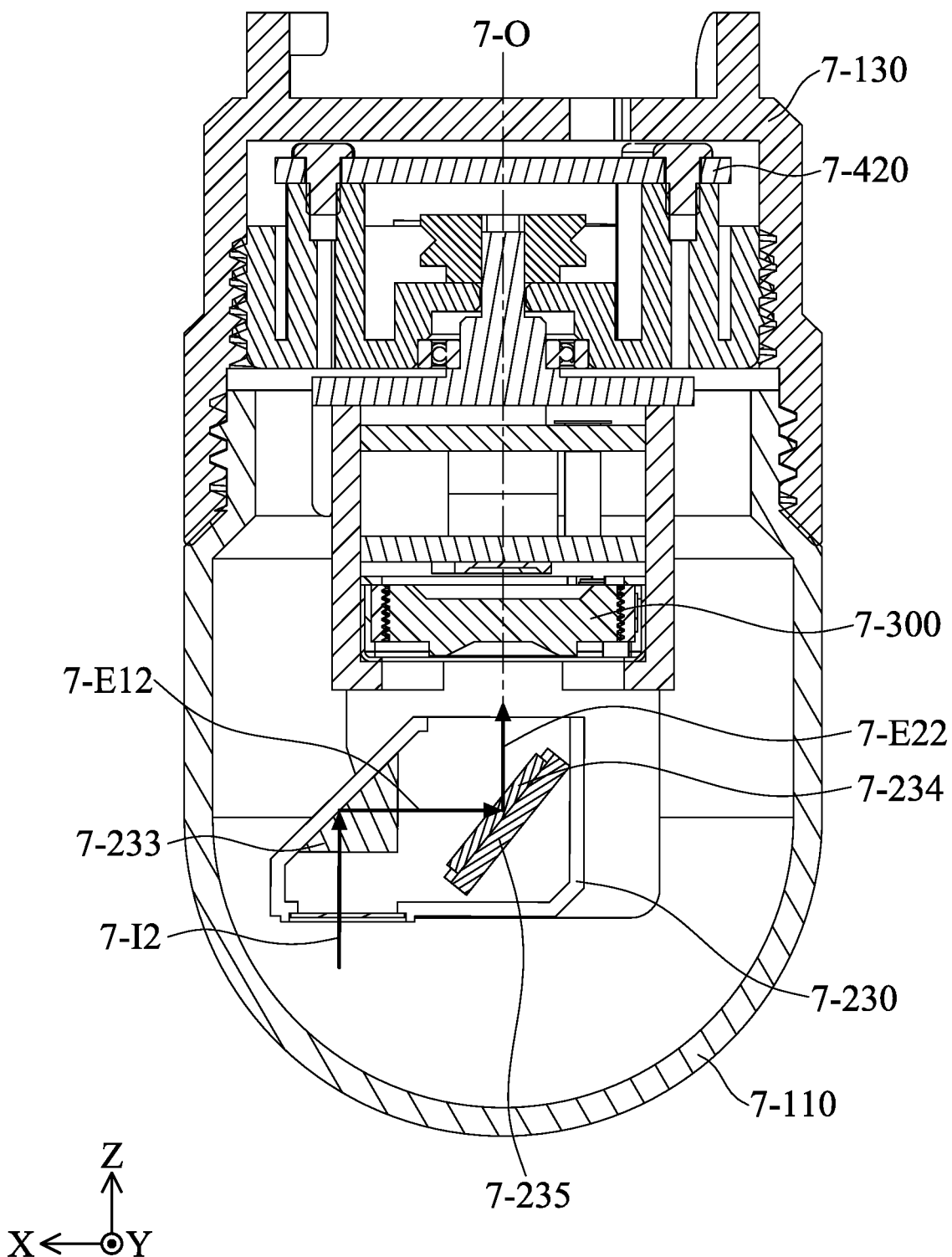
Figure 9C:
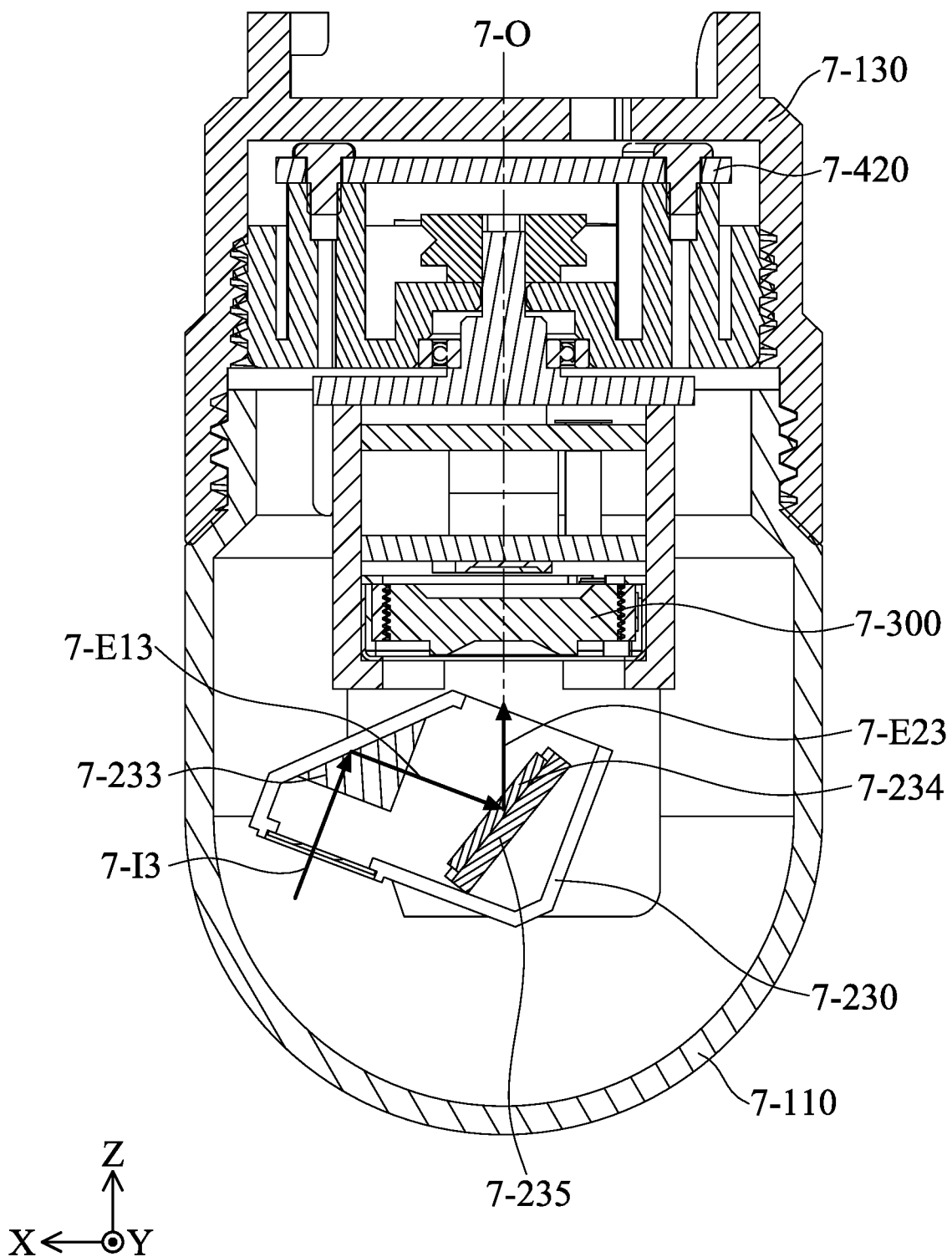

FIG. 9A, FIG. 9B, and FIG. 9C are schematic views when the optical system 7-1 is in operation. The first optical element 7-233 is used to adjust the optical axis of the incident light from an incident direction to a first exit direction, where the incident direction is not parallel to the first exit direction. The second optical element 7-234 is used to adjust the optical axis of the incident light from the first exit direction to a second exit direction, and the first exit direction and the second exit direction are not parallel.

For example, as shown in FIG. 9A, the first optical element 7-233 is used to adjust the optical axis of the incident light from an incident direction 741 to a first exit direction 7-E11, the incident direction 7-11 is not parallel to the first exit direction 7-E11. The second optical element 7-234 is used to adjust the optical axis of the incident light from the first exit direction 7-E11 to a second exit direction 7-E21. The first exit direction 7-E11 is not parallel to the second exit direction 7-E21.

Next, when the direction of the incident light changes, as shown in FIG. 9B, the first optical element 7-233 is used to adjust the optical axis of the incident light from an incident direction 7-12 to a first exit direction 7-E12, the incident direction 7-12 is not parallel to the first exit direction 7-E12. The second optical element 7-234 is used to adjust the optical axis of the incident light from the first exit direction 7-E12 to a second exit direction 7-E22, and the first exit direction 7-E12 and the second exit direction 7-E22 are not parallel.

Afterwards, when the direction of the incident light is further changed, as shown in FIG. 9C, the first optical element 7-233 is used to adjust the optical axis of the incident light from an incident direction 7-13 to a first exit direction 7-E13, and the incident direction 7-13 is not parallel to the first exit direction 7-E13. The second optical element 7-234 is used to adjust the optical axis of the incident light from the first exit direction 7-E13 to a second The exit direction 7-E23, and the first exit direction 7-E13 and the second exit direction 7-E23 are not parallel.

It should be noted that, as shown in FIG. 9A, FIG. 9B, and FIG. 9C, the second exit directions 7-E21, 7-E22, or 7-E23 in the foregoing state are all oriented to the same direction. In other words, parallel to the main axis 7-0. The lens 7-340 and the third circuit element 7-420 (photosensitive element) are arranged along the second exit directions 7-E21, 7-E22, or 7-E23. The second exit direction 7-E21, 7-E22, or 7-E23 are not parallel to the first direction 7-D1, and the second exit directions 7-E21, 7-E22, or 7-E23 and the second direction 7-D2 are parallel. In this way, external light may be reflected by the first optical module 7-200 to the second optical module 7-300, so that the second optical module 7-300 may receive images from all directions. Afterwards, the first optical module 7-200 and the second optical module 7-300 may rotate relative to the main axis 7-0 via the third driving assembly 7-400, so that the optical system 7-1 may capture images in more directions.

In summary, an optical system is provided. The optical system includes a first optical module. The first optical module includes a first fixed portion, a first movable portion, a first driving assembly, and a circuit assembly. The first movable portion is used for connecting to a first optical element, and the first movable portion is movably connected to the fixed portion. The first driving assembly is used for driving the first movable portion to move relative to the first fixed portion. The circuit assembly is electrically connected to the first driving assembly. As a result, the optical system may capture images from different directions, and miniaturization may be achieved.

Although embodiments of the present disclosure and their advantages have been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
   a first optical module, comprising:
      a first fixed portion;
      a first movable portion movably connected to the first fixed portion, wherein the first movable portion is used for connecting to an optical element;
      a first driving assembly used for moving the first movable portion relative to the first fixed portion; and
      a circuit assembly electrically connected to the first driving assembly,
   wherein the first driving assembly is used for driving the first movable portion to rotate relative to the first fixed portion, the rotational axis of the first movable portion extends in a first direction, and the first driving assembly comprises a first driving source and a first transmission element,
   wherein a first driving source is used for generating a first driving force, comprising:
      a first piezoelectric element; and
      a first resilient element disposed on the first piezoelectric element, wherein the first transmission element is connected to the first driving source, and the first transmission element is used for transmitting the first driving force,
   wherein the first transmission element has an elongated shape and extends in a second direction that is not parallel to the first direction, wherein the first optical module further comprises:
      a first pressing assembly used for applying a first pressure to the first driving assembly, wherein the first driving assembly and the first movable portion are arranged in the direction of the first pressure, the direction of the first pressure is not parallel to the first direction, and the first pressing assembly comprises:
         a first pressing element that is resilient;
         a first adjusting element disposed on the first pressing element, wherein the first adjusting element is used for adjusting the value or the direction of the first pressure, and the first adjusting element comprises thread; and
      a first frame, wherein the first driving assembly is disposed on the first frame.

2. The optical system as claimed in claim 1, wherein the first driving assembly further comprises:
   a first bonding element, wherein the first transmission element is connected to the first driving source via the first bonding element;
   a second bonding element, wherein the first resilient element is connected to the first piezoelectric element via the second bonding element;
   a third bonding element, wherein the first transmission element is connected to the first frame via the third bonding element; and
   a position sensing assembly used for sensing the movement of the first movable portion to the first fixed portion.

3. The optical system as claimed in claim 2, wherein the Young's modulus of the first bonding element is greater than the Young's modulus of the second bonding element, and the Young's modulus of the first bonding element is greater than the Young's modulus of the third bonding element.

4. The optical system as claimed in claim 3, wherein the Young's modulus of the second bonding element is greater than the Young's modulus of the third bonding element.

5. The optical system as claimed in claim 4, wherein the first frame comprises:
   a first main body;

a first through hole positioned at the first main body, wherein the first through hole is used for accommodating at least a portion of the first transmission element;

a second through hole positioned at the first main body, wherein the second through hole is used for accommodating at least a portion of the first transmission element;

a first leaning portion disposed on the main body and corresponding to the first pressure assembly; and a second leaning portion disposed on the main body and corresponding to the first pressure assembly, wherein the first leaning portion and the second leaning portion are arranged parallel to the second direction.

6. The optical system as claimed in claim 5, wherein the first optical element is used for adjusting the direction of an incident light from an incident direction to a first exit direction, the incident direction is not parallel to the first exit direction, and the first optical module further comprises:

a second movable portion used for connecting to a second optical element, and the second movable portion is movable relative to the fixed portion; and a second driving assembly used for driving the second movable portion to move relative to the first fixed portion.

7. The optical system as claimed in claim 6, wherein the rotational axis of the second movable portion extends in the first direction, the second optical element is used for adjusting the direction of the incident light from the first exit direction to a second exit direction, and the first exit direction and the second exit direction are not parallel.

8. The optical system as claimed in claim 7, wherein the second driving assembly comprises:

a second driving source used for generating a second driving force, comprising:
a second piezoelectric element;
a second resilient element disposed on the second piezoelectric element; and
a second transmission element used for transmitting the second driving force, wherein the second transmission element has an elongated shape and extends in a third direction, the third direction is not parallel to the first direction, and the first optical module further comprises:
a second pressing assembly used for applying a second pressure to the second driving assembly, wherein the second driving assembly and the second movable portion are arranged in the direction of the second pressure, the direction of the second pressure is not parallel to the first direction, and the second pressing assembly comprises:
a second pressing element that is resilient; and
a second adjusting element used for adjusting the value or the direction of the second pressure.

9. The optical system as claimed in claim 8, wherein the first movable portion, the second movable portion rotate relative to the fixed portion in an identical rotational axis, the first driving assembly does not overlap the second driving assembly when viewed in the first direction, viewed in the second direction, and viewed in a fourth direction, wherein the first direction, the second direction, and the fourth direction are perpendicular each other.

10. The optical system as claimed in claim 9, wherein the second direction is parallel to the third direction, and the first driving assembly and the second driving assembly are arranged in a fifth direction when viewed in the second direction, wherein the fifth direction is not parallel to the first direction, the second direction, and the fourth direction, the fifth direction is not perpendicular to the first direction and the fourth direction, and the direction of the first driving force is parallel to the direction of the second driving force.

11. The optical system as claimed in claim 10, further comprising a second optical module corresponding to the first optical module, wherein the second optical module comprises:

a lens; and a photosensitive element corresponding to the lens, wherein the lens and the photosensitive element are arranged in the second exit direction, the second exit direction is not parallel to the first direction, the second exit direction is parallel to the second direction, and the first optical module and the second optical module are arranged in the second direction.

12. The optical system as claimed in claim 11, further comprising:

a third movable portion connected to the first optical module and the second optical module;

a second fixed portion, wherein the third movable portion is movable relative to the second fixed portion;

a third driving assembly used for driving the third movable portion to move relative to the second fixed portion, wherein the third driving assembly is used for rotate the third movable portion relative to the second fixed portion, and the rotational axis of the third movable portion extends in a sixth direction, the third driving assembly comprises:

a third driving source used for generating a third driving force.

13. The optical system as claimed in claim 12, wherein the third driving source comprises:

a third piezoelectric element;

a third resilient element disposed on the third piezoelectric element; and a third transmission element used for transmitting the third driving force, wherein the third transmission element has an elongated shape and extends in a seventh direction that is not parallel to the sixth direction.

14. The optical system as claimed in claim 13, further comprising:

a third pressing assembly used for applying a third pressure to the third driving assembly, wherein the third driving assembly and the third movable portion are arranged along the direction of the third pressure, the direction of the third pressure is not parallel to the sixth direction.

15. The optical system as claimed in claim 14, wherein the third pressing assembly comprises:

a third pressing element that is resilient; and a third adjusting element used for adjusting the value or direction of the third pressure, wherein the first direction is not parallel to the sixth direction, the seventh direction is parallel to an imaginary plane, the imaginary plane is parallel to the first direction, the imaginary plane is perpendicular to the sixth direction, and the first driving assembly and the second driving assembly are movable relative to the third driving assembly, wherein the third driving assembly does not overlap the first driving assembly when viewed in the sixth direction, and the third driving assembly does not overlap the second driving assembly when viewed in the sixth direction.

16. The optical system as claimed in claim 15, wherein the circuit assembly comprises a first circuit element and a second circuit element, wherein the first circuit element and the second circuit element are arranged in the sixth direction, and the optical system further comprises:
- a control element disposed on the second circuit element, wherein the control element is used for controlling the first driving assembly and the second driving assembly;
- a power source disposed on the second circuit element;
- a wireless communication element disposed on the second circuit element, wherein the wireless communication element is used for providing a wireless signal to an external apparatus;
- a passive electronic element disposed on the second circuit element;
- an interference-suppressing element disposed on the second circuit element; and
- a first spacer disposed between the first circuit element and the second circuit element.

17. The optical system as claimed in claim 16, wherein the first circuit element and the second circuit element are plate-shaped, the first circuit element and the second circuit element are parallel, a gap is formed between the first circuit element and the second circuit element, the first circuit element is closer to the second optical module than the second circuit element, the position sensing assembly is at least partially disposed on the first circuit element.

18. The optical system as claimed in claim 17, wherein the first driving assembly is electrically connected to the first circuit element, the interference-suppressing element is disposed between the position sensing assembly and the second circuit element, and the interference-suppressing element is disposed between the first circuit element and the second circuit element.

* * * * *